(12) United States Patent
Kato et al.

(10) Patent No.: US 11,318,950 B2
(45) Date of Patent: May 3, 2022

(54) CALCULATION APPARATUS, CONTROL METHOD, PROGRAM AND STORAGE MEDIUM

(71) Applicant: PIONEER CORPORATION, Tokyo (JP)

(72) Inventors: Masahiro Kato, Kawagoe (JP); Ryoko Niihara, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 363 days.

(21) Appl. No.: 16/088,972

(22) PCT Filed: Mar. 29, 2016

(86) PCT No.: PCT/JP2016/060229
§ 371 (c)(1),
(2) Date: Sep. 27, 2018

(87) PCT Pub. No.: WO2017/168586
PCT Pub. Date: Oct. 5, 2017

(65) Prior Publication Data
US 2019/0106113 A1    Apr. 11, 2019

(51) Int. Cl.
*B60W 40/114*    (2012.01)
(52) U.S. Cl.
CPC ....... *B60W 40/114* (2013.01); *B60W 2420/52* (2013.01); *B60W 2520/10* (2013.01);
(Continued)
(58) Field of Classification Search
CPC ........... B60W 40/114; B60W 2555/20; B60W 2420/52; B60W 2520/10;
(Continued)

(56) References Cited

U.S. PATENT DOCUMENTS

2008/0319622 A1\* 12/2008 Katrak ................ B60W 50/029
701/70
2011/0295549 A1   12/2011 Takabayashi et al.
(Continued)

FOREIGN PATENT DOCUMENTS

JP    2000074931 A  \*  3/2000
JP    2003-118558 A     4/2003
(Continued)

OTHER PUBLICATIONS

International Search Report for related International Application No. PCT/JP2016/060229, dated Jun. 21, 2016; 2 pages.

*Primary Examiner* — Yoshihisa Ishizuka
*Assistant Examiner* — Carter W Ferrell
(74) *Attorney, Agent, or Firm* — Procopio, Cory, Hargreaves & Savitch LLP

(57)    ABSTRACT

In cases when it is determined that a measured yaw angle ($\Psi_L$) can be calculated on the basis of the output of a LIDAR (12), a control unit (15) calculates the measured yaw angle ($\Psi_L$) as the estimated yaw angle ($\Psi_E$), and performs calibration processing on a gyro sensitivity coefficient (A), a gyro offset coefficient (B), a steering angle sensitivity coefficient (C) and a steering angle offset coefficient (D). Meanwhile, in cases when it has been determined that the measured yaw angle ($\Psi_L$) cannot be calculated, the control unit (15) calculates a gyro sensor-based yaw rate ($\dot{\Psi}_G$) on the basis of the steering angle sensitivity coefficient (C) and the steering angle offset coefficient (D) while calculating a steering angle-based yaw rate ($\dot{\Psi}_S$) on the basis of the steering angle sensitivity coefficient (C) and the steering angle offset coefficient (D), and weights these calculated values in accordance with the degrees of their reliabilities to thereby calculate an estimated yaw rate ($\dot{\Psi}_E$) for calculating the estimated yaw angle ($\Psi_E$).

7 Claims, 10 Drawing Sheets

(52) U.S. Cl.
CPC . *B60W 2520/105* (2013.01); *B60W 2520/125* (2013.01); *B60W 2520/16* (2013.01); *B60W 2520/18* (2013.01); *B60W 2540/18* (2013.01); *B60W 2555/20* (2020.02)

(58) Field of Classification Search
CPC ..... B60W 2520/105; B60W 2520/125; B60W 2520/16; B60W 2520/18; B60W 2540/18; B60W 40/105; B60W 40/107; B60W 40/10; B60W 2520/14; B60W 2520/28; B60W 40/112; B60W 40/11; B60W 2050/0088; B60W 2050/0215; B60W 30/02; B60W 30/12; B60W 30/18145; B60W 2050/0031; B60W 2300/36; B60W 2520/06; B60W 30/045; B60W 40/076; B60W 50/029; B60W 2720/14; B60W 50/0205; B60W 50/0097; B60W 40/12; G05D 2201/0213; G05D 1/0088; G05D 1/027; B60T 8/1755; B60T 8/172; B60T 2250/03; G01C 21/16; G01C 21/28; G01C 21/165; G01C 19/00; G01P 3/50; G01P 7/00; G01P 3/44; G01P 21/00; G01P 3/36; G01P 3/42; G01S 17/58; G01S 13/931; G01S 7/497; B60G 2400/0523; B60G 2400/204; B60G 2800/702; B60R 21/0132

See application file for complete search history.

(56) References Cited

U.S. PATENT DOCUMENTS

| | | | |
|---|---|---|---|
| 2012/0173040 A1* | 7/2012 | Yokota | B60W 30/02 701/1 |
| 2014/0163808 A1 | 6/2014 | Seo et al. | |
| 2017/0015315 A1 | 1/2017 | Hattori et al. | |

FOREIGN PATENT DOCUMENTS

| | | | |
|---|---|---|---|
| JP | 2008032632 A | | 2/2008 |
| JP | 2011247721 A | | 12/2011 |
| JP | 2012-66777 A | | 4/2012 |
| JP | 2012066777 A | * | 4/2012 |
| JP | 2012-171545 A | | 9/2012 |
| JP | 2013075639 A | | 4/2013 |
| JP | 2013-147182 A | | 8/2013 |
| JP | 2014-215232 A | | 11/2014 |
| JP | 2015-178325 A | | 10/2015 |
| JP | 2015190920 A | | 11/2015 |
| JP | 2016002792 A | | 1/2016 |

* cited by examiner

US 11,318,950 B2

CALCULATION APPARATUS, CONTROL METHOD, PROGRAM AND STORAGE MEDIUM

CROSS-REFERENCE TO RELATED APPLICATIONS

This application is a U.S. National Stage entry of PCT Application No: PCT/JP2016/060229 filed Mar. 29, 2016, the contents of which are incorporated herein by reference.

TECHNICAL FIELD

The present invention relates to a technology for accurately estimating a yaw angle of a moving body.

BACKGROUND TECHNIQUE

There is known a technology of estimating a yaw rate of the own vehicle. For example, Patent Reference-1 discloses a method for correcting an error of a yaw rate sensor by estimating the yaw rate of the own vehicle based on the variation of the relative position of a fixed object to the own vehicle.

Patent Reference-1: Japanese Patent Application Laid-open under No. 2012-066777

DISCLOSURE OF INVENTION

Problem to be Solved by the Invention

According to the method disclosed in Patent Reference-1, it is possible to accurately estimate the yaw rate of the own vehicle when there is a fixed object in the vicinity of the own vehicle. In contrast, Patent Reference-1 fails to disclose a method for obtaining the yaw rate of the own vehicle with a high degree of accuracy in such a condition that there is no fixed object in the vicinity of the own vehicle in a long time.

The above is an example of issues to be solved by the present invention. An object of the present invention is to provide a calculation apparatus capable of accurately estimating the yaw rate.

Means for Solving the Problem

One invention is a calculation apparatus including: a correction unit configured to correct, on a basis of a first yaw rate and information associated with a moving body, calculation information to be used for calculation of a second yaw rate, the first yaw rate being acquired from information associated with surroundings of the moving body; and a control unit configured to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable.

Another invention is a control method executed by a calculation apparatus, including: a correction process to correct, on a basis of a first yaw rate and information associated with a moving body, calculation information to be used for calculation of a second yaw rate, the first yaw rate being acquired from information associated with surroundings of the moving body; and a control process to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable.

Still another invention is a program executed by a computer, the program making the computer function as: a correction unit configured to correct, on a basis of a first yaw rate and information associated with a moving body, calculation information to be used for calculation of a second yaw rate, the first yaw rate being acquired from information associated with surroundings of the moving body; and a control unit configured to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable.

DETAILED DESCRIPTION OF THE PREFERRED EMBODIMENTS

Figure 1:
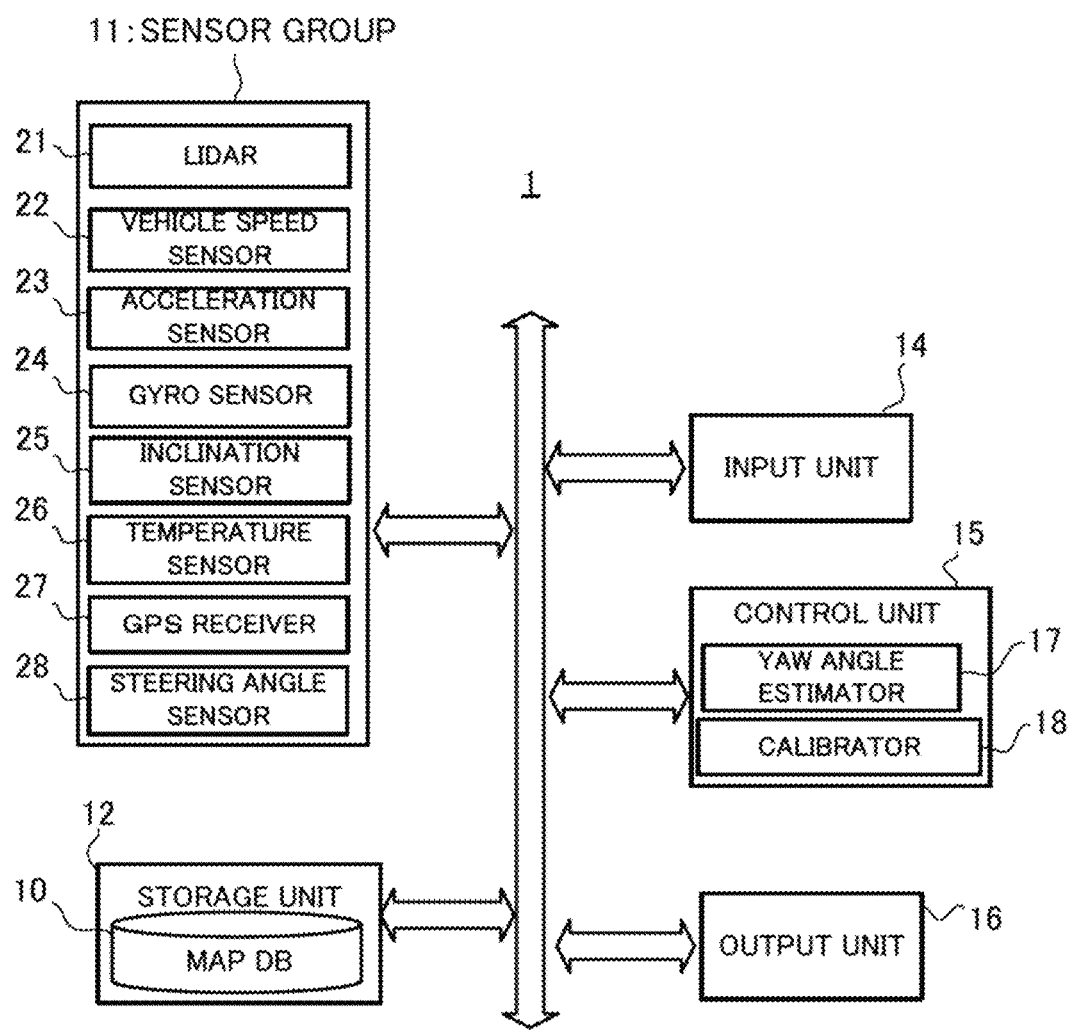
FIG. 1 illustrates a schematic configuration of a vehicle mounted apparatus.

According to a preferable embodiment of the present invention, a calculation apparatus includes: a correction unit configured to correct, on a basis of a first yaw rate and information associated with a moving body, calculation information to be used for calculation of a second yaw rate, the first yaw rate being acquired from information associated with surroundings of the moving body; and a control unit configured to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable.

The above calculation apparatus includes a correction unit and a control unit. On a basis of a first yaw rate, which is acquired from information associated with surroundings of a moving body, and information associated with a moving body, the correction unit corrects the calculation information to be used for calculation of a second yaw rate of the moving body. In a case that the first yaw rate is obtainable, the control unit corrects the calculation information while determining the first yaw rate as the second yaw rate. In another case that the first yaw rate is not obtainable, the control unit calculates the second yaw rate based on the information associated with the moving body and the corrected calculation information. According to this mode, when the calculation apparatus can calculate a first yaw rate with a high degree of accuracy based on the information associated with the surroundings of the moving body, the calculation apparatus corrects the calculation information to be used in the case where the first yaw rate cannot be calculated. Thereby, even when the first yaw rate cannot be calculated, the calculation apparatus can calculate the second yaw rate with reliability by using the corrected calculation information.

In one mode of the calculation apparatus, the calculation apparatus further includes: a first calculation unit configured to calculate a yaw rate of the moving body based on output of an angular speed sensor mounted on the moving body and the calculation information; a second calculation unit configured to calculate a yaw rate of the moving body based on a steering angle of the moving body, a speed of the moving body and the calculation information; and a third calculation unit configured to calculate the second yaw rate based on the yaw rate calculated by the first calculation unit and the yaw rate calculated by the second calculation unit. According to this mode, even when the first yaw rate cannot be calculated, the calculation apparatus can suitably calculate the second yaw rate with reliability based on two yaw rates which the first and the second calculation unit calculate in different ways by use of the calculation information.

In another mode of the calculation apparatus, the correction unit corrects, on a basis of the first yaw rate and the speed of the moving body, each of first conversion information and second conversion information as the calculation information, the first yaw rate being obtained from the information associated with surroundings of the moving body, the first conversion information being necessary for the first calculation unit to calculate the yaw rate, the second conversion being necessary for the second calculation unit to calculate the yaw rate. In this way, when the first yaw rate with reliability can be calculated based on the information associated with the surroundings of the moving body, the calculation apparatus updates the first conversion information and the second conversion information which are necessary for the first and the second calculation units to calculate the yaw rate. Thereby, it is possible to calculate the second yaw rate with reliability even when the first yaw rate cannot be calculated.

In still another mode of the calculation apparatus, the third calculation unit determines weights, which is used for calculating the second yaw rate, on the yaw rate calculated by the first calculation unit and on the yaw rate calculated by the second calculation unit on a basis of at least one of temperature variation amount, variation amount of lateral acceleration of the moving body and variation amount of roll angle of the moving body which are calculated from a time of correcting the calculation information. The calculation apparatus according to this mode accurately determines the weights, to calculate the second yaw rate, on the yaw rates calculated by the first and the second calculation units in accordance with their reliabilities by considering each variation amount which causes the error of the calculation information.

In still another mode of the calculation apparatus, the third calculation unit determines the weights on the yaw rate calculated by the first calculation unit and on the yaw rate calculated by the second calculation unit on a basis of at least one of variation amount of longitudinal acceleration of the moving body and variation amount of a pitch angle of the moving body which are calculated from the time of correcting the calculation information in addition to the temperature variation amount, the variation amount of the lateral acceleration and the variation amount of the roll angle. The calculation apparatus according to this mode accurately determines the weights, to calculate the second yaw rate, on the yaw rates calculated by the first and the second calculation units in accordance with their reliabilities by further considering other variation amount which is likely to cause the error of the calculation information in addition to the variation amount which causes the error of the calculation information.

According to another preferable embodiment of the present invention, there is provided a control method executed by a calculation apparatus, including: a correction process to correct, on a basis of a first yaw rate and information associated with a moving body, calculation information to be used for calculation of a second yaw rate, the first yaw rate being acquired from information associated with surroundings of the moving body; and a control process to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable. By executing the control method, even when the first yaw rate cannot be calculated, the calculation apparatus can calculate the second yaw rate with reliability by using the corrected calculation information.

According to still another preferable embodiment of the present invention, there is provided a program executed by a computer, the program making the computer function as: a correction unit configured to correct, on a basis of a first yaw rate and information associated with a moving body, calculation information to be used for calculation of a second yaw rate, the first yaw rate being acquired from information associated with surroundings of the moving body; and a control unit configured to correct the calculation information while determining the first yaw rate as the second yaw rate in a case that the first yaw rate is obtainable and calculate the second yaw rate based on the information associated with the moving body and the corrected calculation information in a case that the first yaw rate is not obtainable. By executing the program, the computer can calculate the second yaw rate with reliability by using the corrected calculation information even when the first yaw rate cannot be calculated. Preferably, the program can be treated in a state that it is stored in a storage medium.

EMBODIMENT

Now, a preferred embodiment of the present invention will be described below with reference to the attached drawings. Hereinafter, for the sake of convenience of explanation, a character with "•" on the top is expressed in the specification as "A•" ("A" stands for a character).

[Schematic Configuration]

FIG. 1 illustrates a schematic configuration of a vehicle mounted apparatus 1 according to the embodiment. The vehicle mounted apparatus 1 is a device which accurately estimates the yaw angle of a vehicle on which the vehicle mounted apparatus 1 is mounted, and mainly includes a sensor group 11, a storage unit 12, an input unit 14, a control unit 15 and an output unit 16. The vehicle mounted apparatus 1 is one mode of the "calculation device" according to the present invention.

The sensor group 11 mainly includes a LIDAR (Light Detection and Ranging, or Laser Illuminated Detection and Ranging) 21, a vehicle speed sensor 22, an acceleration sensor 23, a gyro sensor 24, an inclination sensor 25, a temperature sensor 26, a GPS receiver 27 and a steering angle sensor 28.

The LIDAR 21 discretely measures distance to an external object by emitting pulsed laser beams within a predetermined angle range (angle of field). The LIDAR 21 outputs a point group of measurement points each of which is a combination of the distance to an object which reflects the pulsed laser and the emitting angle of the pulsed laser. The LIDAR 21 according to the embodiment is used for detection of landmarks provided on or around a road. Examples of the landmarks include periodically arranged features along a road such as a mile marker, a hundred-meter post, a delineator, a traffic infrastructure (e.g., a signage, a direction signboard and a traffic signal), a utility pole and a street lamp.

A vehicle speed sensor 22 measures the vehicle speed based on a pulse signal generated in response to the rotation of the wheels of the vehicle. The acceleration sensor 23 detects the acceleration in the travelling direction (referred to as "longitudinal direction") of the vehicle and the acceleration in the lateral (sideward) direction (referred to as "lateral direction") of the vehicle. Hereinafter, "detected longitudinal acceleration" indicates the acceleration in the longitudinal direction of the vehicle detected through the acceleration sensor 23 and "detected lateral direction" indicates the acceleration in the lateral direction of the vehicle detected through the acceleration sensor 23.

Figure 2:
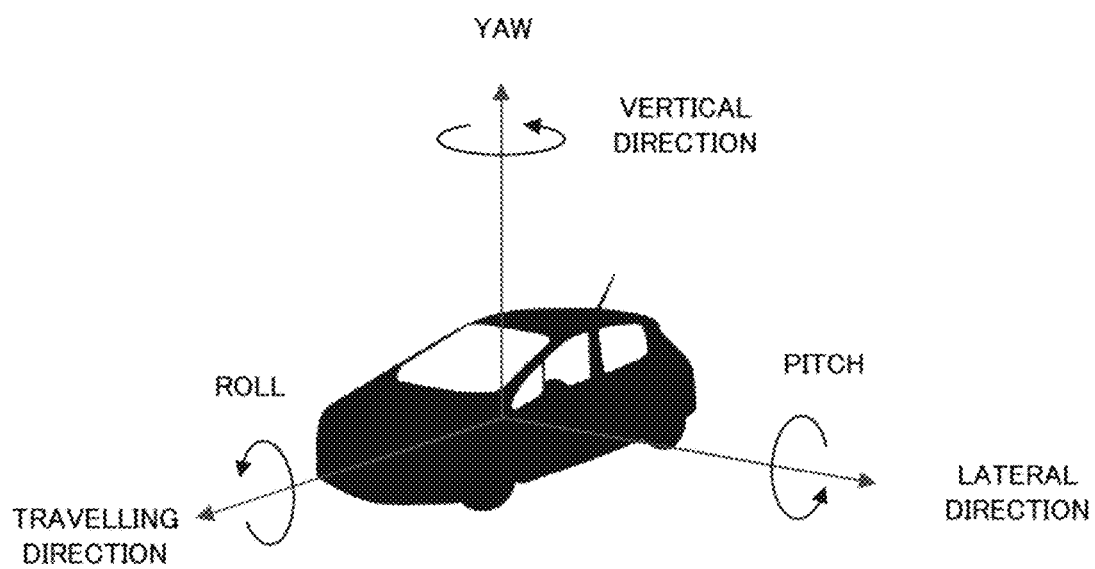
FIG. 2 illustrates each rotational direction corresponding to the yaw, the roll and the pitch with respect to the vehicle.

The gyro sensor 24 detects the rotational angular velocity with respect to the angle (simply referred to as "yaw angle") around the vertical direction (i.e., height direction) of the vehicle. FIG. 2 illustrates each rotational direction corresponding to the yaw, the roll and the pitch with respect to the vehicle. According to the embodiment, "roll angle $\phi$" stands for a rotation angle around the travelling direction, "pitch angle $\theta$" stands for a rotation angle around the lateral direction and "yaw angle $\psi$" stands for a rotation angle around the vertical direction. For example, the roll angle $\phi$ and pitch angle $\theta$ are defined so that the roll angle $\phi$ and the pitch angle $\theta$ of the horizontal direction are 0 degree respectively, and the yaw angle $\psi$ is defined so that the yaw angle $\psi$ of a predetermined orientation is 0 degree. Similarly, according to the embodiment, "roll rate $\phi\bullet$" stands for the rotational angular velocity around the travelling direction, "pitch rate $\theta\bullet$" stands for a rotational angular velocity around the lateral direction and "yaw rate $\psi\bullet$" stands for a rotational angular velocity around the vertical direction.

A description will be given of each component of the vehicle mounted apparatus 1 with reference to FIG. 1 again. The inclination sensor 25 detects an inclination angle of the vehicle in the pitch direction and in the roll direction with respect to the horizontal plane. Hereinafter, the inclination angle in the pitch direction outputted by the inclination sensor 25 is referred to as "detected pitch angle" and the inclination angle in the roll direction outputted by the inclination sensor 25 is referred to as "detected roll angle". The temperature sensor 26 detects the temperature substantially at the gyro sensor 24. Hereinafter, the temperature detected and outputted by the temperature sensor 26 is referred to as "detected temperature". The GPS receiver 27 receives an electric wave for transmitting downlink data including position measurement data from plural GPS satellites to thereby detect the absolute position of the vehicle. The steering angle sensor 28 detects the steering angle of the vehicle. Hereinafter, the steering angle detected by the steering angle sensor 28 is referred to as "detected steering angle". Output of each sensor in the sensor group 11 is supplied to the control unit 15.

It is noted that all or a part of sensor(s) in the sensor group 11 may be equipped with the vehicle. In this case, the control unit 15 acquires, from the vehicle, the output of the sensor(s) equipped with the vehicle through a predetermined communication protocol such as CAN.

The storage unit 12 stores a program to be executed by the control unit 15 and information necessary for the control unit 15 to execute a predetermined process. According to the embodiment, the storage unit 12 stores the map database (DB) 10 including the road data and the landmark information. It is noted that the map DB 10 may be periodically updated. In this case, for example, via a communication unit, the control unit 15 receives, from a server device which stores map information, partial map information associated with an area of the own vehicle position, and then updates the map DB 10 with the partial map information. It is noted that a server device capable of communicating with the vehicle mounted apparatus 1 may store the map DB 10 instead of the storage unit 12. In this case, the control unit 15 acquires, from the map DB 10, necessary information such as landmark information through the data communication with the server device.

Examples of the input unit 14 include a button, a remote controller and an audio input device for user operations. The output unit 16 is a display and/or a speaker which output under the control of the control unit 15, for example.

The control unit 15 includes a CPU for executing programs and controls the entire vehicle mounted apparatus 1. The control unit 15 according to the embodiment includes a yaw angle estimator 17 and a calibrator 18.

The yaw angle estimator 17 calculates an estimate value (referred to as "estimated yaw angle $\psi_E$") of the yaw angle to be used for other processes such as calculation of the own vehicle position. On one hand, when it is possible to estimate the yaw angle based on the output of the LIDAR 21, the yaw angle estimator 17 determines, as the estimated yaw angle $\psi_E$, the yaw angle (referred to as "measured yaw angle $\psi_L$") of the vehicle which is measured based on the output of the LIDAR 21. On the other hand, when it is impossible to calculate the measured yaw angle $\psi_L$, the yaw angle estimator 17 firstly calculates an estimate value (referred to as "estimated yaw rate $\psi\bullet_E$") of the yaw rate to be used for calculation of the estimated yaw angle $\psi_E$. In this case, the yaw angle estimator 17 calculates an estimate value (referred to as "gyro sensor-based yaw rate $\dot{\psi}^*_G$") of the yaw rate based on the output of the gyro sensor 24 while calculating an estimate value (referred to as "steering angle-based yaw rate $\dot{\psi}^*_S$") of the yaw rate based on the vehicle speed and the steering angle. Then, the yaw angle estimator 17 weights their estimate values to calculate the estimated yaw rate $\dot{\psi}^*_E$. Then, the yaw angle estimator 17 calculates the estimated yaw angle $\psi_E$ at the current processing time (referred to as "time t") based on the estimated yaw rate $\dot{\psi}^*_E$ at the time t and the estimated yaw angle $\psi_E$ calculated at the previous (one time before) processing time (referred to as "time t−1"). The estimated yaw rate $\dot{\psi}^*_E$ is an example of the "second yaw rate" according to the present invention.

The calibrator 18 calibrates a gyro sensitivity coefficient "A" and a gyro offset coefficient "B" based on the measured yaw angle $\psi_L$ when it is possible to estimate the yaw rate based on the output of the LIDAR 21, wherein the gyro sensitivity coefficient A and the gyro offset coefficient B are coefficients needed to convert the yaw rate detected by the gyro sensor 24 into the gyro sensor-based yaw rate $\dot{\psi}^*_G$. Additionally, the calibrator 18 calibrates a steering angle sensitivity coefficient "C" and a steering angle offset coefficient "D" based on the measured yaw angle $\psi_L$ and the vehicle speed ("measured vehicle speed $V_L$") measured by use of the output of the LIDAR 21, wherein the steering angle sensitivity coefficient C and steering angle offset coefficient D are coefficients needed to convert the detected steering angle detected by the steering angle sensor 28 into the steering angle-based yaw rate $\dot{\psi}^*_S$. Detail descriptions of the coefficients A to D will be given later. The gyro sensitivity coefficient A and the gyro offset coefficient B are examples of the "calculation information" and "first conversion information" according to the present invention, and the steering angle sensitivity coefficient C and the steering angle offset coefficient D are examples of the "calculation information" and "second conversion information" according to the present invention.

It is noted that the control unit 15 is an example of the "first calculation unit", "second calculation unit", "third calculation unit", "control unit", "correction unit" and a computer which executes a program according to the present invention. Information associated with the distance and direction with respect to nearby object(s) detected by the LIDAR 21 is an example of the "information associated with surroundings of a moving body" according to the present invention.

[Overview of Estimated Yaw Angle Calculating Process]

Next, a description will be given of an overview of the method of calculating the estimated yaw angle $\psi_E$ executed by the control unit 15. Schematically, at the time of determining that it is possible to calculate the measured yaw angle $\psi_L$, the control unit 15 calculates the measured yaw angle $\psi_L$ as the estimated yaw angle $\psi_E$ while calibrating the coefficients A to D based on the output of the LIDAR 21. In contrast, at the time of determining that it is impossible to calculate the measured yaw angle $\psi_L$, the control unit 15 calculates the gyro sensor-based yaw rate $\dot{\psi}^*_G$ and the steering angle-based yaw rate $\dot{\psi}^*_S$ and weights these yaw rates by using most recently calibrated coefficients A to D in accordance with the degrees of their reliabilities to thereby calculate the estimated yaw rate $\dot{\psi}^*_E$ to be used for calculation of the estimated yaw angle $\psi_E$.

Specifically, when determining that there is a landmark within the measurement range of the LIDAR 21 that is to be used to measure the yaw angle by the LIDAR 21, the control unit 15 calculates the measured vehicle speed $V_L$ and the measured yaw angle $\psi_L$ based on the variation of the relative positions of the landmark and the variation of the relative directions of the landmark which are specified through the output of the LIDAR 21. Additionally, the control unit 15 performs calibrations of the coefficients A to D by using the measured vehicle speed $V_L$ and the measured yaw angle $\psi_L$ after the calculations. The method for the determination of the possibility of the calculation of the measured yaw angle $\psi_L$ and the calibration method will be described in the section "Detail of Estimated Yaw Angle Calculating Process".

In contrast, when determining that the calculation of the measured yaw angle $\psi_L$ is impossible, according to the following equation (1), the control unit 15 calculates the gyro sensor-based yaw rate $\dot{\psi}^*_G[t]$ at the current time t that is the target time of the process by using the yaw rate ("detected yaw rate") "$\omega[t]$" that the gyro sensor 24 outputs at the current time t, the gyro sensitivity coefficient A and the gyro offset coefficient B.

$$\dot{\psi}_G[t] = A\omega[t] + B \qquad (1)$$

Meanwhile, according to the following equation (2), the control unit 15 calculates the steering angle-based yaw rate $\dot{\psi}^*_S[t]$ at the current time t by using the estimated vehicle speed "$V_E[t]$" at the current time t, the detected steering angle "$S[t]$" at the current time t, the steering angle sensitivity coefficient C and the steering angle offset coefficient D.

$$\dot{\psi}_S[t] = V_E[t](CS[t] + D) \qquad (2)$$

The estimated vehicle speed $V_E[t]$ is a vehicle speed (vehicle body speed) measured or estimated through the output of the LIDAR 21, the vehicle speed sensor 22 and/or other sensors in the sensor group 11, and the present embodiment does not depend on the derivation process of the estimated vehicle speed $V_E[t]$. A detail description of the method to derive the equations (1) and (2) will be explained in the section "Detail of Estimated Yaw Angle Calculating Process".

Next, a description will be given of the weighting for calculating the estimated yaw rate $\dot{\psi}^*_E$ by using the gyro sensor-based yaw rate $\dot{\psi}^*_G$ and the steering angle-based yaw rate $\dot{\psi}^*_S$.

The control unit 15 calculates the difference (referred to as "temperature difference $\Delta T$") between the detected temperatures at the time "$t_0$" and at the current time t, wherein the time $t_0$ is when the most recent calibration was executed (i.e., when the measured yaw angle $\psi_L$ and the measured vehicle speed $V_L$ were calculated). The control unit 15 also calculates the difference (referred to as "longitudinal acceleration difference $\Delta\alpha_x$") between the detected longitudinal accelerations at the time $t_0$ and at the current time t, the difference (referred to as "lateral acceleration difference $\Delta\alpha_y$") between the detected lateral accelerations at the time $t_0$ and at the current time t, the difference (referred to as "pitch angle difference $\Delta\theta$") between the detected pitch angles at the time $t_0$ and at the current time t, the difference (referred to as "roll angle difference $\Delta\phi$") between the detected roll angles at the time $t_0$ and at the current time t. Then, the control unit 15 determines that the accuracy of the gyro sensor-based yaw rate $\dot{\psi}^*_G$ decreases relative to the accuracy of the steering angle-based yaw rate $\dot{\psi}^*_S$ with increasing temperature difference $\Delta T$, and lowers the weight on the gyro sensor-based yaw rate $\dot{\psi}^*_G$ relative to the weight on the steering angle-based yaw rate $\dot{\psi}^*_S$ as the temperature difference $\Delta T$ increases. Additionally, the control unit 15 determines that the accuracy of the steering angle-based yaw rate $\dot{\psi}^*_S$ decreases relative to the accuracy of the gyro sensor-based yaw rate $\dot{\psi}^*_G$ with the increasing longitudinal acceleration difference $\Delta\alpha_x$, lateral acceleration difference $\Delta\alpha_y$, pitch angle difference $\Delta\theta$ or roll angle difference $\Delta\phi$, and lowers the weight on the steering angle-based yaw rate $\dot{\psi}^*_S$ relative to the weight on the gyro sensor-based yaw rate $\dot{\psi}^*_G$ as the longitudinal acceleration difference $\Delta\alpha_x$, the lateral acceleration difference $\Delta\alpha_y$, the pitch angle difference $\Delta\theta$ or the roll angle difference $\Delta\phi$ increases.

In consideration of the above explanation, according to the embodiment, as an example of the weighting method, the control unit 15 calculates the estimated yaw rate $\dot{\psi}^*_E$ by using the steering angle-based yaw rate $\dot{\psi}^*_S$ and the gyro sensor-based yaw rate $\dot{\psi}^*_G$ according to the following equation (3).

$$\dot{\psi}_E[t] = \frac{\Delta T^2}{\Delta T^2 + \Delta\alpha_x^2 + \Delta\alpha_y^2 + \Delta\theta^2 + \Delta\phi^2}\dot{\psi}_S[t] + \frac{\Delta\alpha_x^2 + \Delta\alpha_y^2 + \Delta\theta^2 + \Delta\phi^2}{\Delta T^2 + \Delta\alpha_x^2 + \Delta\alpha_y^2 + \Delta\theta^2 + \Delta\phi^2}\dot{\psi}_G[t] \quad (3)$$

In some embodiments, the temperature difference $\Delta T$, the longitudinal acceleration difference $\Delta\alpha_x$, the lateral acceleration difference $\Delta\alpha_y$, the pitch angle difference $\Delta\theta$, and the roll angle difference $\Delta\phi$ may be normalized to be substantially in the same range of values (e.g., range from 0 to 1).

Figure 3:
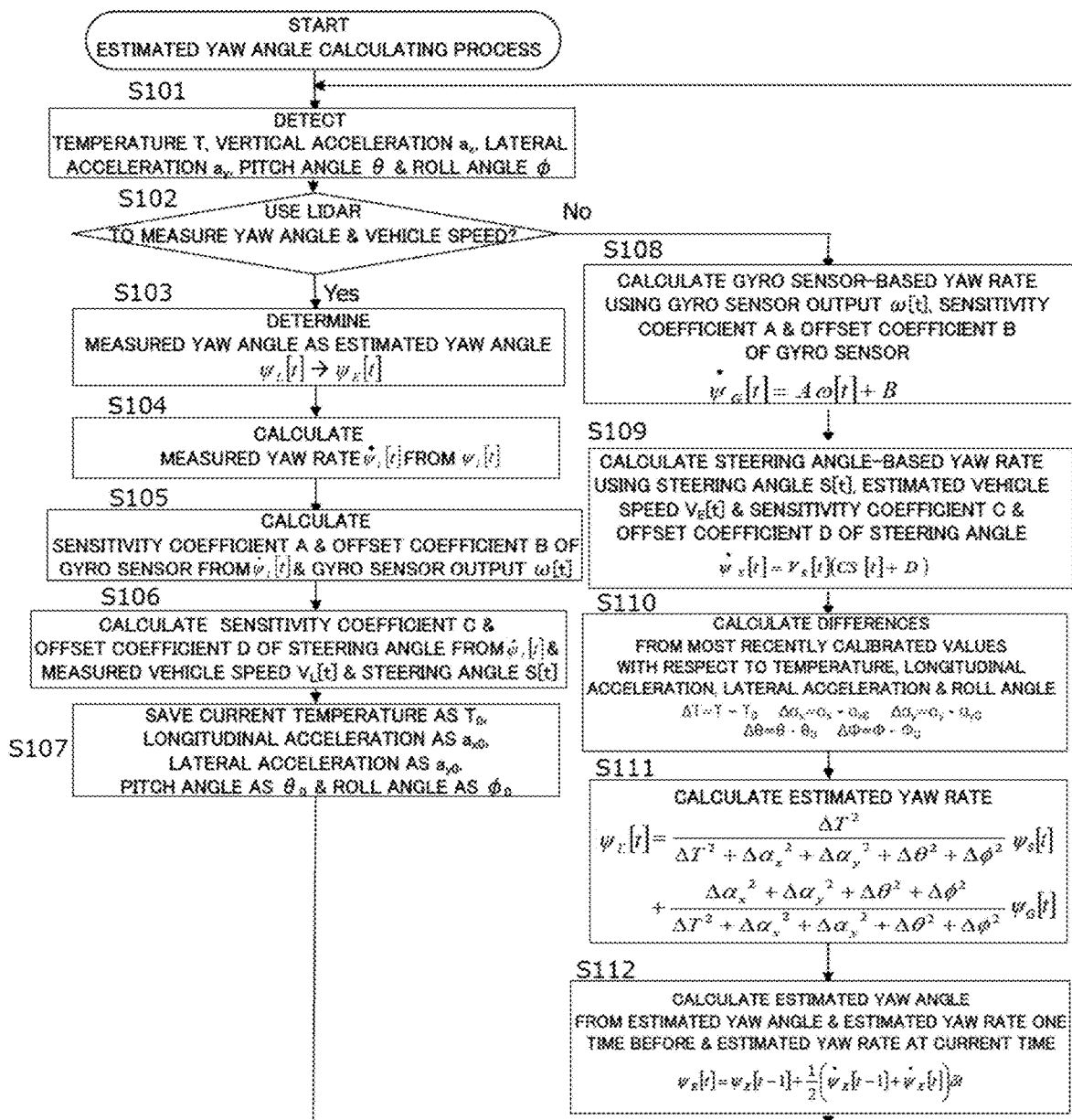
FIG. 3 is a flowchart illustrating an overview of the estimated yaw angle calculating process according to the embodiment.

FIG. 3 is a flowchart illustrating an overview of the estimated yaw angle calculating process according to the embodiment.

Firstly, the control unit 15 detects the temperature "T" at the time t by the temperature sensor 26, the longitudinal acceleration "$\alpha_x$" and the lateral acceleration "$\alpha_y$" by the acceleration sensor 23 and the pitch angle "$\theta$" and the roll angle "$\phi$" by the inclination sensor 25 (step S101).

Next, the control unit 15 determines whether or not the measurement of the vehicle speed and the yaw angle by use of the LIDAR 21 is possible (step S102). Namely, the control unit 15 determines whether or not the control unit 15 can calculate the measured vehicle speed $V_L$ and the measured yaw angle $\psi_L$. The detail of the above determination method will be explained later. Then, when the control unit 15 determines that the measurement of the vehicle speed and the yaw angle by use of the LIDAR 21 is possible (step S102; Yes), the control unit 15 executes the process at step S103 to step S107. In contrast, when the control unit 15 determines that the measurement of the vehicle speed and the yaw angle by use of the LIDAR 21 is impossible (step S102; No), the control unit 15 executes the process at step S108 to step S112.

A description will be given of the process at step S103 to step S107 to be executed at the time when the measurement of the vehicle speed and the yaw angle by use of the LIDAR 21 is possible.

The control unit 15 calculates the measured yaw angle $\psi_L[t]$ at the current time t from the output of the LIDAR 21 by using a known method and determines the measured yaw angle $\psi_L[t]$ as the estimated yaw angle $\psi_E[t]$ at the current time t (step S103). Then, the control unit 15 calculates the measured yaw rate "$\dot{\psi}_L^*[t]$" at the current time t from the measured yaw angle $\psi_L$ at the current time t (step S104). The measured yaw rate $\dot{\psi}_L^*[t]$ is an example of the "first yaw rate" according to the present invention. On the assumption that the measurement time interval "$\delta_t$" between the current time t and the previous time t−1 is adequately short, the measured yaw rate $\dot{\psi}_L^*[t]$ is calculated according to the following equation (4) that indicates the variation of the measured yaw angle $\psi_L$ per unit time during the time period from the time t−1 to the time t.

$$\dot{\psi}_L[t] = \frac{\psi_L[t] - \psi_L[t-1]}{\delta t} \quad (4)$$

Next, the control unit 15 calculates the gyro sensitivity coefficient A and the gyro offset coefficient B based on the measured yaw rate $\dot{\psi}_L^*[t]$ and the detected yaw rate $\omega[t]$ which the gyro sensor 24 outputs (step S105). Furthermore, the control unit 15 calculates the steering angle sensitivity coefficient C and the steering angle offset coefficient D based on the measured yaw rate $\dot{\psi}_L^*[t]$, the measured vehicle speed $V_L[t]$ and the detected steering angle S[t] at the time t (step S106). The detail description of the process at step S105 and step S106 will be explained later.

Then, the control unit 15 saves the temperature T, the longitudinal acceleration $\alpha_x$, the lateral acceleration $\alpha_y$, the pitch angle $\theta$ and the roll angle $\phi$ which are detected at step S101 as the detected temperature "$T_0$", detected longitudinal acceleration "$\alpha_{x0}$", the detected lateral acceleration "$\alpha_{y0}$", the detected gradient angle "$\theta_0$" and the detected roll angle "$\phi_0$", respectively. Then, the process goes back to step S101.

Next, a description will be given of the process at step S108 to step S112 executed at the time when the vehicle speed and the yaw angle cannot be measured by use of the LIDAR 21.

The control unit 15 calculates the gyro sensor-based yaw rate $\dot{\psi}^*_G[t]$ at the time t according to the equation (1) by using the detected yaw rate $\omega[t]$ which the gyro sensor 24 outputs, the latest gyro sensitivity coefficient A and the latest gyro offset coefficient B calculated at step S105. Next, by using the detected steering angle S[t], the estimated vehicle speed $V_E[t]$, the latest steering angle sensitivity coefficient C and the latest steering angle offset coefficient D calculated step S106, the control unit 15 calculates the steering angle-based yaw rate $\dot{\psi}^*_S[t]$ at the time t according to the equation (2) (step S109). Then, the control unit 15 calculates the temperature difference $\Delta T$ ($=T-T_0$), the longitudinal acceleration difference $\Delta\alpha_x$ ($=\alpha_x-\alpha_{x0}$), the lateral acceleration difference $\Delta\alpha_y$ ($=\alpha_y-\alpha_{y0}$), the pitch angle difference $\Delta\theta$ ($=\theta-\theta_0$) and the roll angle difference $\Delta\phi$ ($=\phi-\phi_0$) generated during the time between the time $t_0$ and the current time t, wherein the time $t_0$ is when the most recent calibration at step S105 and step S106 was performed (step S110). Then, the control unit 15 calculates the estimated yaw rate $\dot{\psi}^*_E$ at the time t according to the equation (3) by using the gyro sensor-based yaw rate $\dot{\psi}^*_G[t]$ calculated at step S108, the steering angle-based yaw rate $\dot{\psi}^*_S[t]$ calculated at step S109 and each difference value $\Delta t$, $\Delta\alpha_x$, $\Delta\alpha_y$, $\Delta\theta$ and $\Delta\phi$ calculated at step S110 (step S111).

In this way, every time the control unit 15 measures the yaw angle through the measurement of landmark(s) by use of the LIDAR 21, the control unit 15 calibrates the gyro sensitivity coefficient A, the gyro offset coefficient B, the steering angle sensitivity coefficient C and the steering angle offset coefficient D which are necessary for calculation of the gyro sensor-based yaw rate $\dot{\psi}^*_G$ and the steering angle-based yaw rate $\dot{\psi}^*_S$, wherein the gyro sensor-based yaw rate $\dot{\psi}^*_G$ and the steering angle-based yaw rate $\dot{\psi}^*_S$ are calculated when the yaw angle cannot be measured by use of the LIDAR 21. Thereby, the control unit 15 can suitably keep the reliability of the gyro sensor-based yaw rate $\dot{\psi}^*_G$ and the steering angle-based yaw rate $\psi \cdot_S$ that are calculated when the yaw angle cannot be measured by use of the LIDAR 21. Furthermore, by calculating the estimated yaw angle $\psi_E$ through the above-mentioned weighting in such a case that the measured yaw angle $\psi_L$ cannot be calculated, the control unit 15 can suitably compensate for shortcomings of both of the gyro sensor-based yaw rate $\psi \cdot_G$ and the steering angle-based yaw rate $\psi \cdot_S$, wherein the error of the gyro sensor-based yaw rate $\psi \cdot_G$ increases with increasing variation (i.e., temperature difference $\Delta T$) of the temperature while the error of the steering angle-based yaw rate $\psi \cdot_S$ increases with increasing variations of the longitudinal acceleration (i.e., longitudinal acceleration difference $\Delta \alpha_x$), the lateral acceleration (i.e., lateral acceleration difference $\Delta \alpha_y$), the pitch angle (i.e., pitch angle difference $\Delta \theta$) and/or the roll angle (i.e., roll angle difference $\Delta \phi$).

Thereafter, by using the estimated yaw angle $\psi_E[t-1]$ at the previous processing time t−1, the estimated yaw rate $\psi \cdot_E[t-1]$ at the previous processing time t−1 and the estimated yaw rate $\psi \cdot_E[t]$ at the current time t, the control unit 15 calculates the estimated yaw angle $\psi_E[t]$ at the current time t according to the following equation (5) which uses the trapezoidal approximation (Trapezoidal Rule) (step S112).

$$\psi_E[t] = \psi_E[t-1] + \frac{1}{2}(\dot{\psi}_E[t-1] + \dot{\psi}_E[t])\delta t \qquad (5)$$

A supplemental explanation on the process at step S112 will be described below.

Figure 4A:
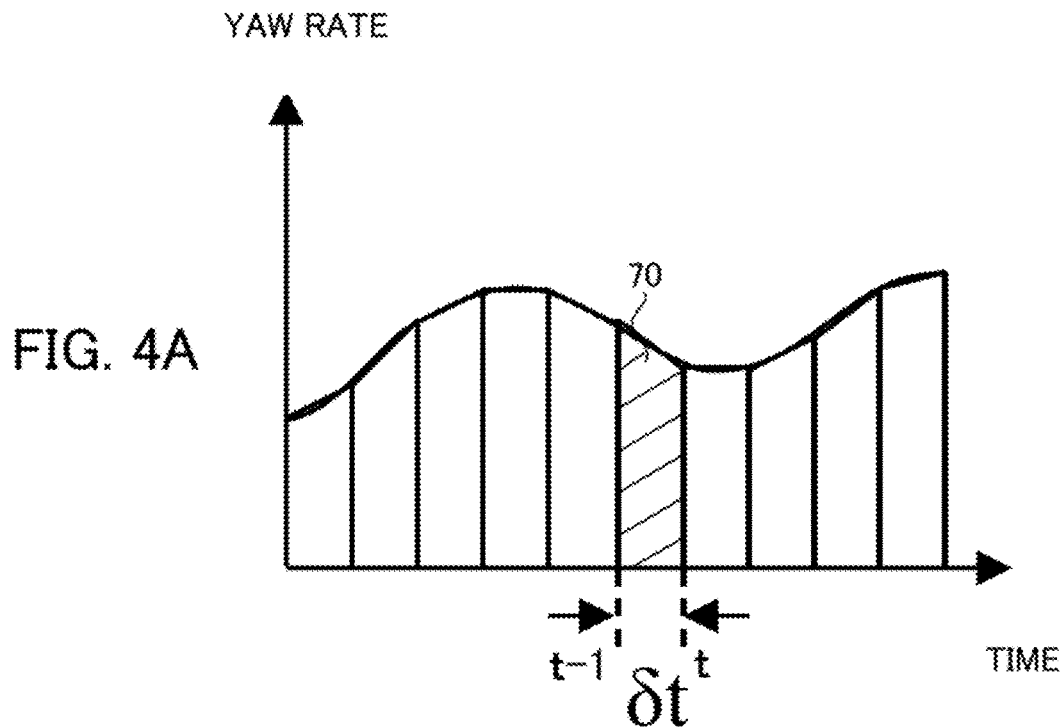
FIG. 4A is a graph illustrating trapezoidal approximation to the time variation of the true (real) yaw rate by use of an estimated yaw rate acquired at a measurement time interval.

FIG. 4A is a graph illustrating the trapezoidal approximation to the time variation of the true (real) yaw rate by use of the estimated yaw rate $\psi \cdot_E$ acquired at the measurement time interval $\delta_t$. According to this example, the area of the trapezoid 70 sandwiched by the line of the time t−1 and the line of the time t is considered as an increase/decrease in the yaw angle during the time period between the time t−1 and the time t. It is noted that the area of the trapezoid 70 corresponds to the second member in the above equation (5). Thus, the estimated yaw angle $\psi_E[t]$ at the current time t is equivalent, as indicated by the equation (5), to the sum of the estimated yaw angle $\psi_E[t-1]$ that is calculated one time before and the area of the trapezoid 70.

It is noted that the control unit 15 may calculate the estimated yaw angle $\psi_E[t]$ based on the rectangular (reed shape) approximation instead of the trapezoid approximation.

Figure 4B:
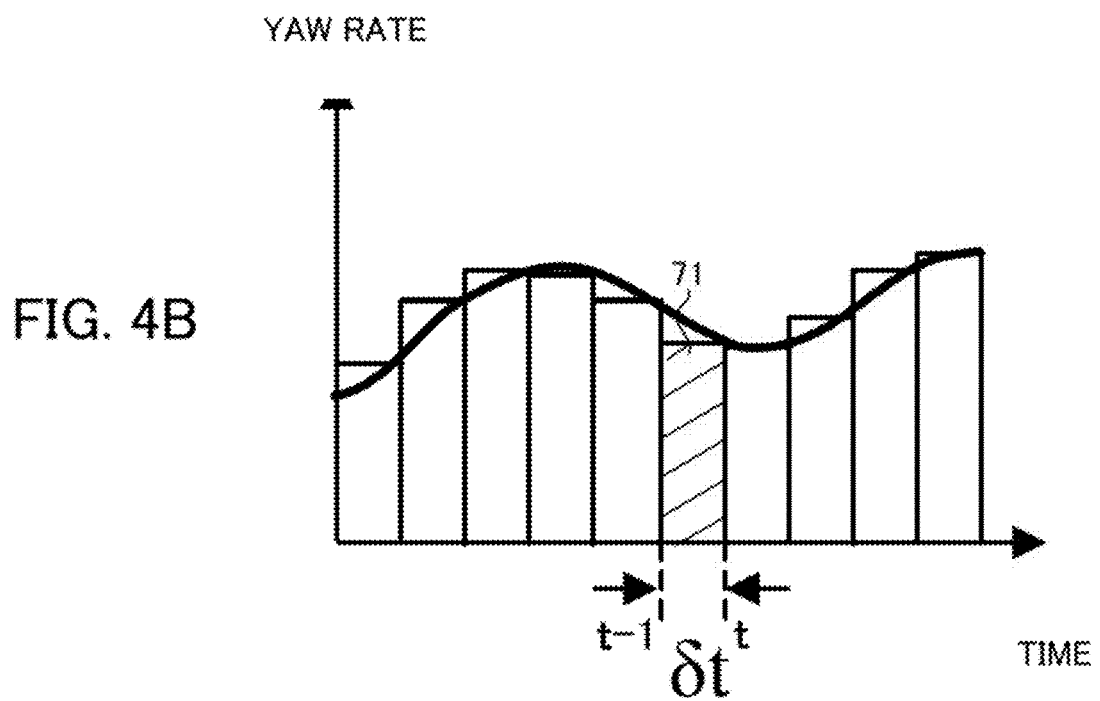
FIG. 4B is a graph illustrating rectangular approximation to the time variation of the true (real) yaw rate by use of the estimated yaw rate acquired at the measurement time interval.

FIG. 4B is a graph illustrating the rectangular approximation to the time variation of the true (real) yaw rate by use of the estimated yaw rate $\psi \cdot_E$ acquired at the measurement time interval $\delta_t$. According to this example, the area of the rectangle 71 sandwiched between the line of the time t−1 and the line of the time t is considered as an increase/decrease in the yaw angle during the time period between the time t−1 and the time t. The area of the rectangle 71 is equivalent to the estimated yaw rate $\psi \cdot_E[t-1]$, which corresponds to the long side of the rectangle, multiplied by the measurement time interval $\delta_t$, which corresponds to the short side of the rectangle. Thus, the estimated yaw angle $\psi_E[t]$ at the present time t is expressed by the following equation (6).

$$\psi_E[t] = \psi_E[t-1] + \dot{\psi}_E[t]\delta t \qquad (6)$$

In this way, the control unit 15 can properly calculate the estimated yaw angle $\psi_E[t]$ from the estimated yaw rate $\psi \cdot_E[t]$ according to either the equation (5) or the equation (6).

[Detail of Estimated Yaw Angle Calculating Process]

(1) Calculation of Coefficients A, B and Gyro Sensor Based Yaw Rate $\psi \cdot_G$ First, a description will be given of the calibrations of the gyro sensitivity coefficient A and the gyro offset coefficient B.

Figure 5A:
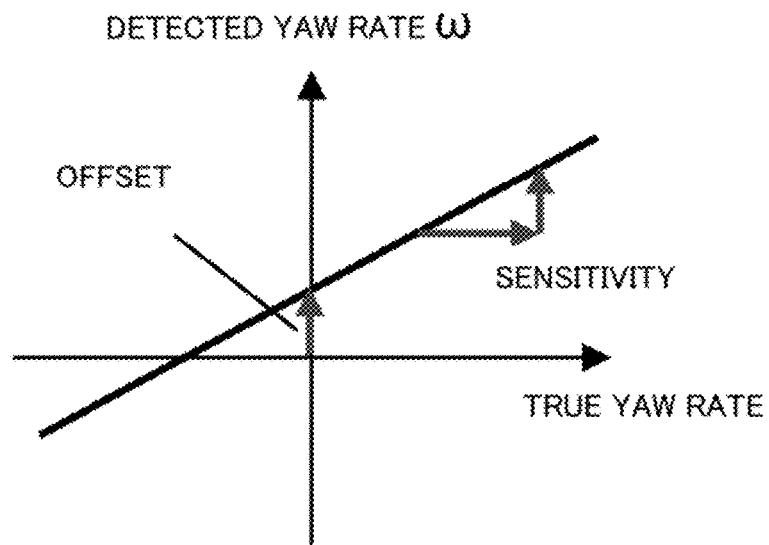
FIG. 5A is a graph illustrating the relationship between the true yaw rate corresponding to the horizontal axis and the detected yaw rate corresponding to the vertical axis.
Figure 5B:
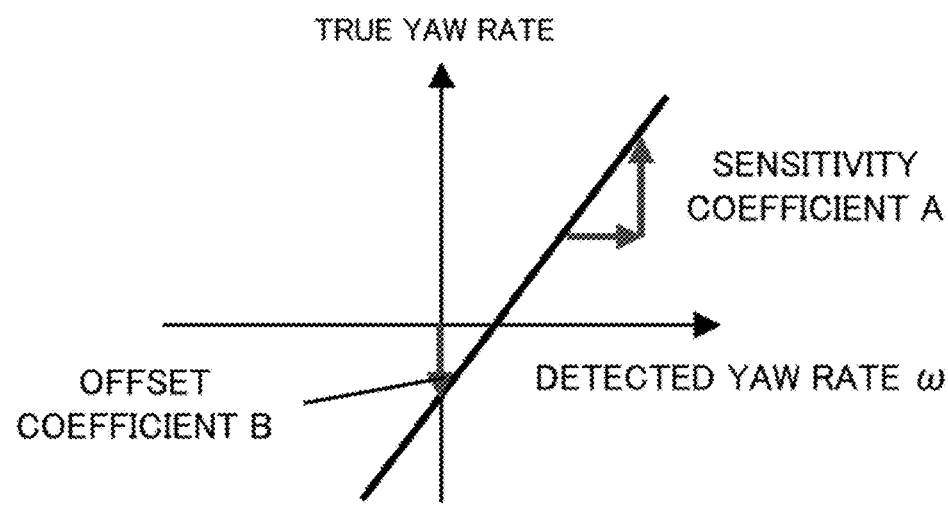
FIG. 5B is a graph illustrating the relationship between the detected yaw rate corresponding to the horizontal axis and the true yaw rate corresponding to the vertical axis.

FIG. 5A is a graph illustrating the relationship between the true yaw rate corresponding to the horizontal axis and the detected yaw rate $\omega$ detected by the gyro sensor 24 corresponding to the vertical axis. As illustrated in FIG. 5A, since gyro sensors generally have high linearity, the relationship between the true yaw rate and the detected yaw rate $\omega$ can be substantially expressed by a linear expression. FIG. 5B is FIG. 5A in which the horizontal axis and the vertical axis are replaced with each other. In FIG. 5B, the slope of the graph corresponds to the gyro sensitivity coefficient A which indicates the ratio of the variation of the true yaw rate to the variation of the detected yaw rate $\omega$ while the intercept of the graph corresponds to the gyro offset coefficient B which indicates the true acceleration at the time when the detected yaw rate $\omega$ is 0. The sensitivity corresponding to the slope of the graph illustrated in FIG. 5A can be expressed by use of the sensitivity coefficient A as "1/A" and the offset corresponding to the intercept of the graph illustrated in FIG. 5A can be expressed by use of the gyro sensitivity coefficient A and the gyro offset coefficient B as "−B/A".

As described above, the detected yaw rate $\omega$ detected by using the gyro sensor 24 has the sensitivity and the offset. Thus, true yaw rate $\psi \cdot$ can be expressed by use of the detected yaw rate $\omega$ as $$\psi \cdot = A\omega + B.$$

It is noted that the measured yaw rate $\psi_L \cdot$ calculated by use of the LIDAR 21 can be regarded as the true yaw rate. Thus, the measured yaw rate $\psi_L \cdot [t]$ at the time t is expressed as $$\psi_L \cdot [t] = A\omega[t] + B.$$

In this case, provided that $$x[t] = \omega[t] \text{ and}$$

$$y[t] = \psi_L \cdot [t],$$

the above equation can be expressed as the following equation (7).

$$y[t] = Ax[t] + B \qquad (7)$$

Since the equation (7) is a linear expression, it is possible to calculate the gyro sensitivity coefficient A and the gyro offset coefficient B with multiple pairs of x[t] and y[t]. Thus, in a time period when the control unit 15 can calculate the measured yaw rate $\psi_L \cdot$, the control unit 15 saves a pair of the measured yaw rate $\psi_L \cdot [t]$ and the detected yaw rate $\omega[t]$ as a pair of x[t] and y[t]. Then, on the basis of a regression analysis such as an iterative least squares technique, the control unit 15 calculates the gyro sensitivity coefficient A corresponding to the slope of the linear expression and the gyro offset coefficient B corresponding to the intercept thereof by using most recently acquired multiple pairs of x[t] and y[t]. In contrast, in a period when the control unit 15 cannot calculate the measured yaw rate $\psi_L \cdot$, on the basis of the most recently calculated gyro sensitivity coefficient A and gyro offset coefficient B, the control unit 15 can calculate the gyro sensor-based yaw rate $\psi \cdot_G$ according to the equation (1) which uses the detected yaw rate $\omega[t]$.

(2) Calculation of Coefficients C, D and Steering Angle Based Yaw Rate $\dot{\psi}_S$ First, a description will be given on basic issues regarding derivations of the steering angle sensitivity coefficient C and the steering angle offset coefficient D.

Figure 6A:
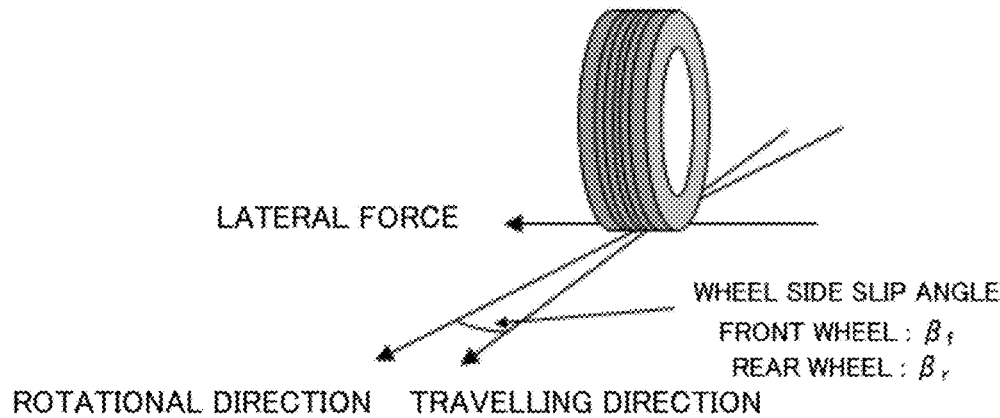
FIGS. 6A and 6B illustrate lateral forces to be generated at wheels.
Figure 6B:
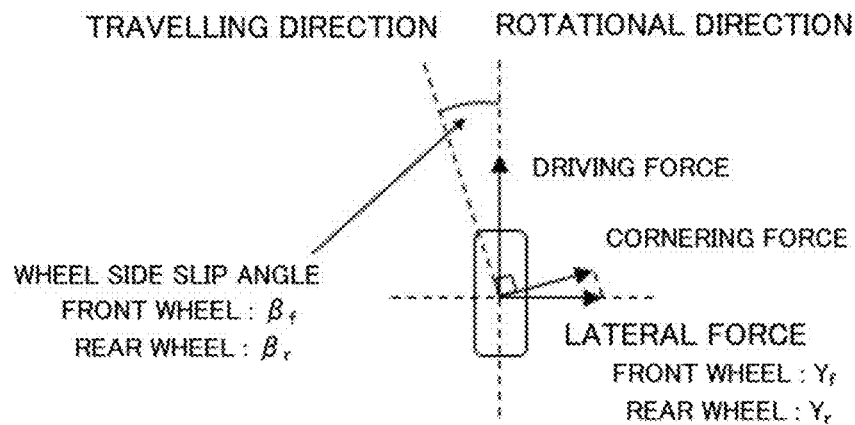

FIGS. 6A and 6B illustrate lateral forces to be generated at wheels. Generally, as a wheel is tilted from the traveling direction of the vehicle, there arises a difference (so-called wheel side slip angle) between the travelling direction of the wheel and the rotational direction of the wheel. When a wheel side slip angle arises, there also arises a lateral force with respect to the wheel. The lateral force in this case is equivalent to the wheel side slip angle multiplied by the cornering stiffness. Namely, the lateral force "$Y_f$" arising at a front wheel and the lateral force "$Y_r$" arising at a rear wheel is expressed as follows by use of the front wheel side slip angle "$\beta_f$" and the rear wheel side slip angle "$\beta_r$", the front wheel cornering stiffness "$K_f$" and the rear wheel cornering stiffness "$K_r$".

$$Y_f = -K_f \cdot \beta_f$$

$$Y_r = -K_r \cdot \beta_r$$

Figure 7A:
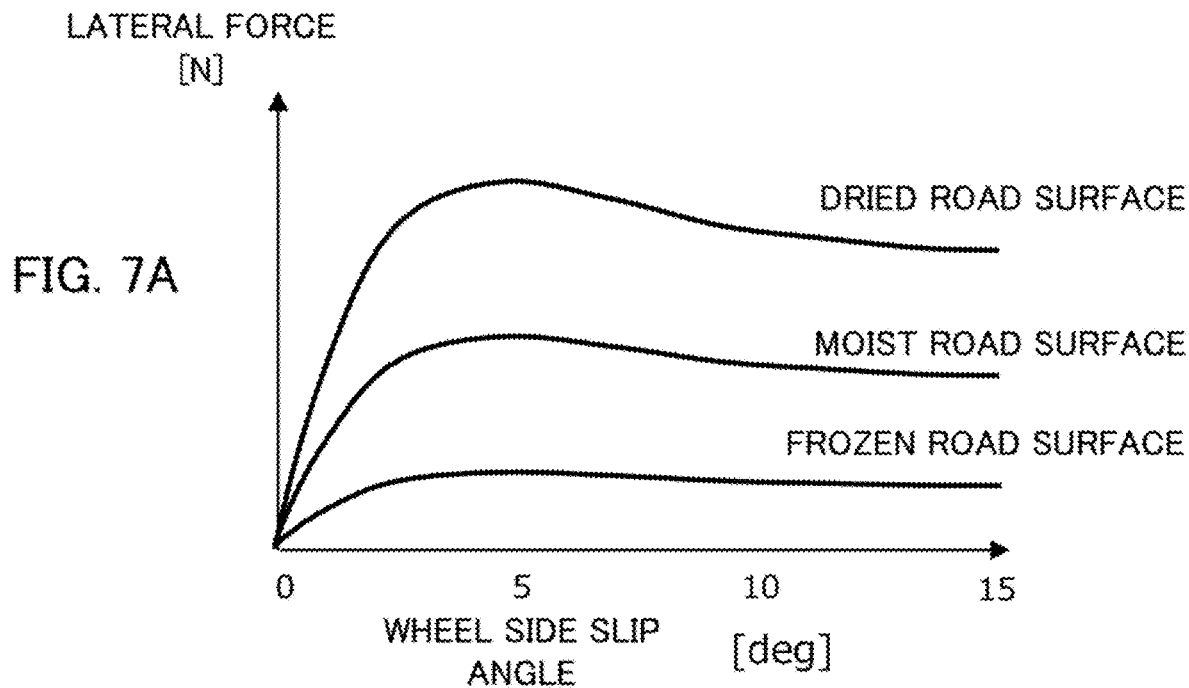
FIG. 7A illustrates a relationship between the wheel side slip angle and the lateral force with respect to a dried road surface, a moist road surface and a frozen road surface.
Figure 7B:
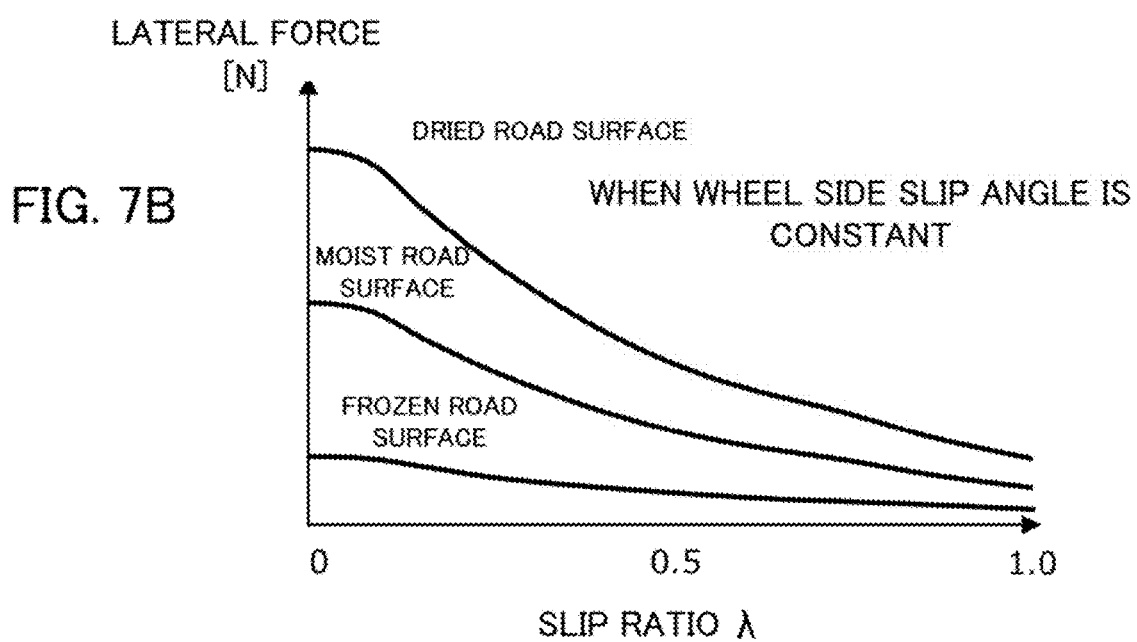
FIG. 7B illustrates a relationship between the slip ratio and the lateral force in cases where the wheel side slip angle is constant.

The lateral force varies depending on the slipperiness of the road surface and the slip ratio. FIG. 7A illustrates a relationship between the wheel side slip angle and the lateral force with respect to a dried road surface, a moist road surface and a frozen road surface. According to FIG. 7A, the drier and the less slippery the road surface is, the larger the lateral force with respect to the same wheel side slip angle becomes. FIG. 7B illustrates a relationship between the slip ratio "λ" and the lateral force in cases where the wheel side slip angle is constant. According to FIG. 7B, at the time when the wheel side slip angle is constant, the drier and the less slippery the road surface is, the larger the lateral force relative to the same slip ratio λ becomes.

When the lateral force arises, the vehicle starts a rotating movement in response to the force in the lateral direction from the road surface. The rotating movement generates the speed in the lateral direction. The lateral acceleration $\alpha_y$ is expressed as the following equation (8) using "vehicle side slip angle β" that is an angle between the front direction of the vehicle and the direction of the vehicle speed (vehicle body speed), the vehicle speed "V", the angular speed "$\dot{\beta}$" of the vehicle side slip angle β and the yaw rate "$\dot{\psi}$" of the vehicle.

$$\alpha_y = V(\dot{\beta} + \dot{\psi}) \tag{8}$$

Thus, the equation of motion with respect to the lateral direction can be expressed as the following equation (9).

$$mV(\dot{\beta} + \dot{\psi}) = 2Y_f + 2Y_r \tag{9}$$

Figure 8A:
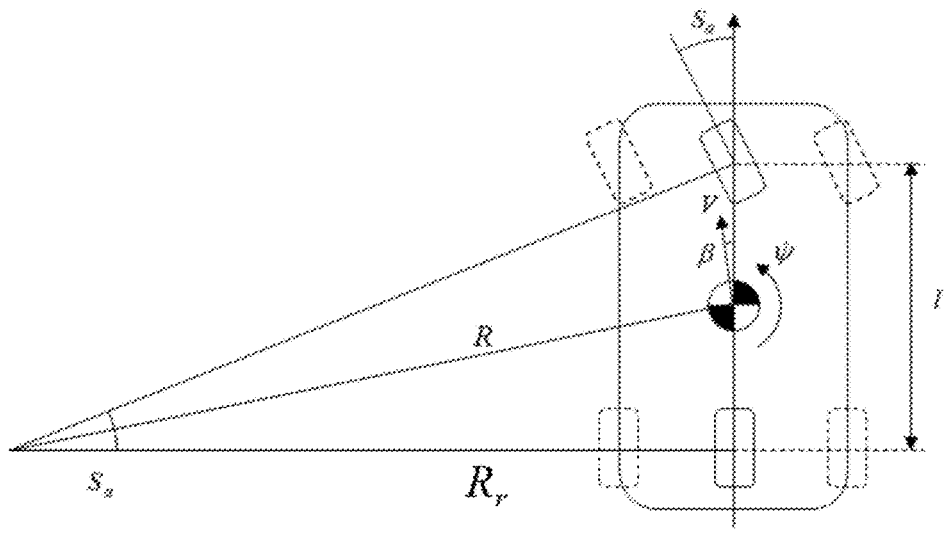
FIG. 8A illustrates each reference sign specifying each state of a vehicle with two wheels in cases where the vehicle is steadily circling in such a low speed state that centrifugal force is not generated.

FIG. 8A illustrates each reference sign specifying each state of a vehicle with two wheels in cases where the vehicle is steadily circling in such a low speed state that the centrifugal force does not arise. In FIG. 8A, "$S_a$" indicates the actual steered angle, "l" indicates the wheelbase, "R" is the turning radius of the vehicle body and "$R_r$" indicates the turning radius of the rear wheel. In this case, the following equations (10) and (11) are satisfied.

$$\dot{\psi} = \frac{V}{R} = \frac{V}{R_r / \cos\beta} \approx \frac{V}{R_r} \tag{10}$$

$$\frac{l}{R_r} = \tan S_a \approx S_a \tag{11}$$

When the equations (10) and (11) are combined, the yaw rate $\dot{\psi}$ is expressed as the following equation (12).

$$\dot{\psi} = \frac{V}{l} S_a \tag{12}$$

Figure 8B:
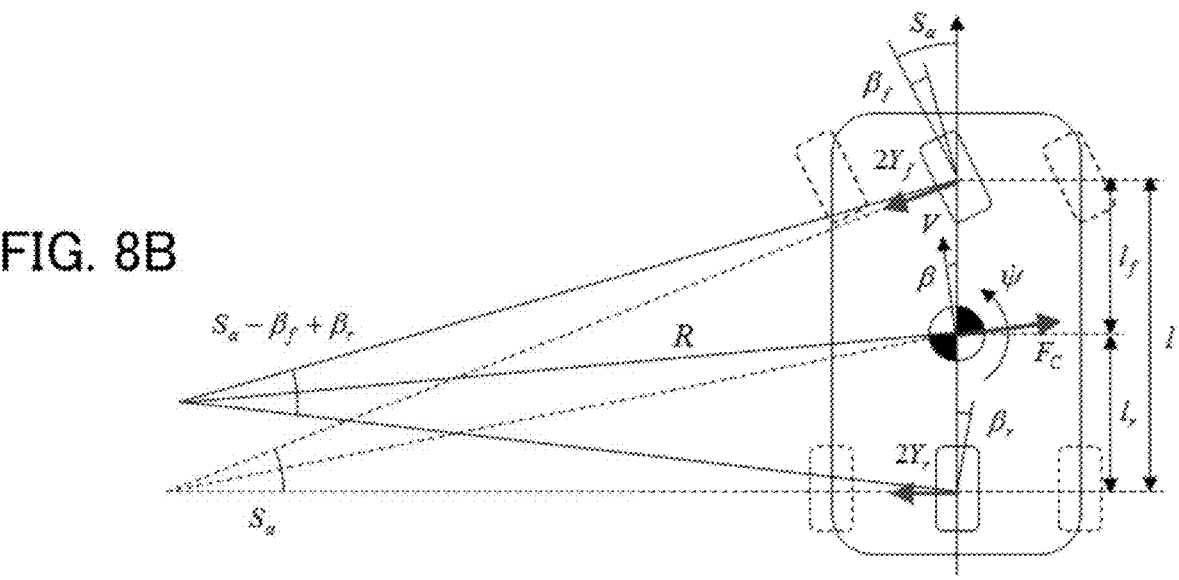
FIG. 8B illustrates each reference sign specifying each state of a vehicle with two wheels in cases where the vehicle is steadily circling in such a high speed state that the centrifugal force is generated.

FIG. 8B illustrates each reference sign specifying each state of a vehicle with two wheels in cases where the vehicle is steadily circling in such a high speed state that the centrifugal force arises. In FIG. 8B, "$F_c$" indicates the centrifugal force, "$l_f$" indicates the distance between the center of the vehicle and the front wheel and "$l_r$" indicates the distance between the center of the vehicle and the rear wheel.

In the case illustrated in FIG. 8B, since the wheel side slip angle $\beta_f$ arises at the front wheel and the wheel side slip angle $\beta_r$ arises at the rear wheel, the center of the rotating movement moves. In this case, the yaw rate $\dot{\psi}$ is expressed as the following equation (13) in which the actual steered angle $S_a$ in the equation (12) is replaced with "$S_a - \beta_f + \beta_r$" in accordance with the relationship illustrated in FIG. 8B.

$$\dot{\psi} = \frac{V}{l}(S_a - \beta_f + \beta_r) \tag{13}$$

The actual steered angle lags behind the steering angle. However, for a normal vehicle driving, the steering operation is moderate, so the relationship between the actual steered angle $S_a[t]$ and the steering angle $S[t]$ at the time t can be expressed by the following proportional relationship.

$$S_a[t] = k \, S[t]$$

Thus, the yaw rate $\dot{\psi}[t]$ is expressed as the following equation (14) based on the above equation indicating the proportional relationship and the equation (13).

$$\dot{\psi}[t] = \frac{V[t]}{l}(kS[t] - \beta_f + \beta_r) \tag{14}$$

$$= V[t]\left(\frac{k}{l}S[t] + \frac{-\beta_f + \beta_r}{l}\right)$$

Hereinafter, both sides of the equation (14) is divided by the vehicle speed V[t] and the steering angle sensitivity coefficient C is defined as the following equation (15) and the steering angle offset coefficient D is defined as the following equation (16).

$$C = \frac{k}{l} \tag{15}$$

$$D = \frac{-\beta_f + \beta_r}{l} \tag{16}$$

In this case, the following equation (17) can be obtained.

$$\frac{\dot{\psi}[t]}{V[t]} = CS[t] + D \tag{17}$$

Since the measured vehicle speed $V_L$ [t] measured by using the LIDAR 21 can be regarded as the true vehicle speed and the measured yaw rate $\psi_L\bullet[t]$ can be regarded as the true yaw rate, the following equation (18) is derived from the equation (17).

$$\frac{\dot{\psi}_L[t]}{V_L[t]} = CS[t] + D \tag{18}$$

Furthermore, through the following substitutions $x[t]=S[t]$ and $y[t]=\psi\bullet_L[t]/V_L[t]$, the following equation (19) can be obtained.

$$y[t]=Cx[t]+D \tag{19}$$

Since the equation (19) is a linear expression, it is possible to calculate the steering angle sensitivity coefficient C and the steering angle offset coefficient D with multiple pairs of x[t] and y[t]. Thus, in a time period when the control unit 15 can calculate the measured yaw angle $\psi_L$ and the measured vehicle speed $V_L$, the control unit 15 saves the detected steering angle S[t] as x[t] and the measured yaw rate $\psi_L\bullet[t]$ divided by the measured vehicle speed $V_L$ [t] as y[t]. Then, on the basis of a regression analysis such as an iterative least squares technique, the control unit 15 calculates the steering angle sensitivity coefficient C corresponding to the slope of the linear expression and the steering angle offset coefficient D corresponding to the intercept thereof by using most recently acquired multiple pairs of x[t] and y[t].

In contrast, in a period when the control unit 15 cannot calculate the measured yaw angle $\psi_L$ and the measured vehicle speed $V_L$, on the basis of the equation (2) that is the equation (17) modified by replacing "V[t]" with "$V_E$[t]" and "$\psi\bullet[t]$" with "$\psi\bullet_S[t]$", the control unit 15 calculates the steering angle-based yaw rate $\psi\bullet_S$. Specifically, on the basis of the most recently calculated steering angle sensitivity coefficient C and steering angle offset coefficient D, the control unit 15 calculates the steering angle-based yaw rate $\psi\bullet_S$ from the detected steering angle S[t] and the estimated vehicle speed $V_E$[t] according to the equation (2). Thereby, the control unit 15 can calculate the steering angle-based yaw rate $\psi\bullet_S$ accurately-approximated to the true yaw rate of the vehicle.

(3) Weight Determination

Next, a description will be given of an approach for determining the weights on the gyro sensor-based yaw rate $\psi\bullet_G$ and the steering angle-based yaw rate $\psi\bullet_S$ based on the temperature difference $\Delta T$, the longitudinal acceleration difference $\Delta\alpha_x$, the lateral acceleration difference $\Delta\alpha_y$, the pitch angle difference $\Delta\theta$ and the roll angle difference $\Delta\phi$.

(3-1) Weighting Based on Temperature Difference $\Delta T$

Generally, the sensitivity (gyro sensitivity coefficient A) and the offset (gyro offset coefficient B) illustrated in FIGS. 5A and 5B vary depending on the environmental temperature of the gyro sensor 24. Thus, it is assumed that the larger the temperature difference $\Delta T$ between temperatures at the time $t_0$ and the current time t is, the larger the errors of the gyro sensitivity coefficient A and the gyro offset coefficient B becomes. In response to the above consideration, according to the embodiment, the control unit 15 determines that the accuracy of the gyro sensor-based yaw rate $\psi\bullet_G$ which includes the coefficients A and B decreases relative to the steering angle-based yaw rate $\psi\bullet_S$ which does not include the coefficients A and B with increasing temperature difference $\Delta T$. Thus, the control unit 15 determines weights on the gyro sensor-based yaw rate $\psi\bullet_G$ and the steering angle-based yaw rate $\psi\bullet_S$ so that the weight on the gyro sensor-based yaw rate $\psi\bullet_G$ decreases relative to the weight on the steering angle-based yaw rate $\psi\bullet_S$ with increasing temperature difference $\Delta T$. Accordingly, even when it is impossible to estimate the yaw angle based on the output of the LIDAR 21, the control unit 15 can calculate the estimated yaw angle $\psi_E$ which is suitably approximated to the true yaw angle.

(3-2) Weighting Based on Roll Angle Difference $\Delta\phi$

Figure 9A:
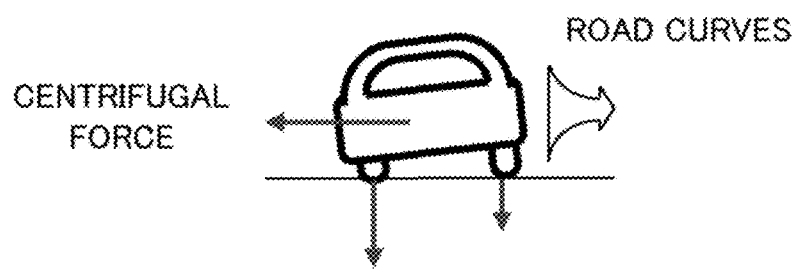
FIG. 9A illustrates the state of the vehicle which is traveling on a road curve.
Figure 9B:
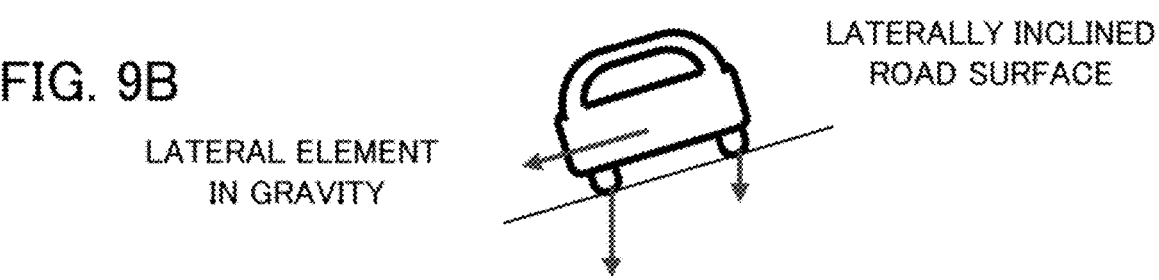
FIG. 9B illustrates the state of the vehicle which is traveling on a laterally inclined road surface.

FIG. 9A illustrates the state of the vehicle which is traveling on a road curve. FIG. 9B illustrates the state of the vehicle which is traveling on a laterally inclined road surface. In FIGS. 9A and 9B, directions of arrows indicate directions of forces and lengths of the arrows indicate magnitudes of the forces.

Generally, when the centrifugal force which arises in response to the rotational movement of the vehicle is large, the suspension system of the vehicle causes the vehicle body to roll, thus shifting the load between the inside wheel and the outside wheel. According to the example illustrated in FIG. 9A, because of the load shift from the inside wheel to the outside wheel at the time of turning on the curve, the load on the inside wheel is smaller than the load on the outside wheel. Even on a laterally inclined road surface, there occurs a similar load shift due to the influence of the lateral element in the gravity. According to the example illustrated in FIG. 9B, the load on the wheel situated on a lower ground is larger than the load on the wheel situated on a higher ground due to the influence of the lateral element in the gravity.

A description will be given of such a case that the load on the wheel at one side decreases by "$\Delta W$" and the load on the wheel at the other side increases by "$\Delta W$".

Figure 9C:
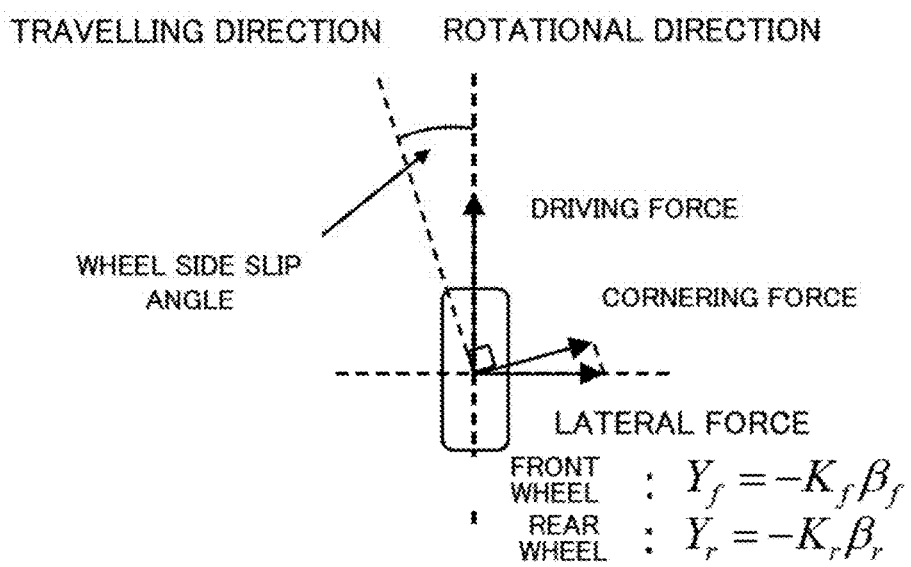
FIG. 9C illustrates the driving force, the lateral force and the cornering force which are generated at a wheel of the traveling vehicle.
Figure 10:
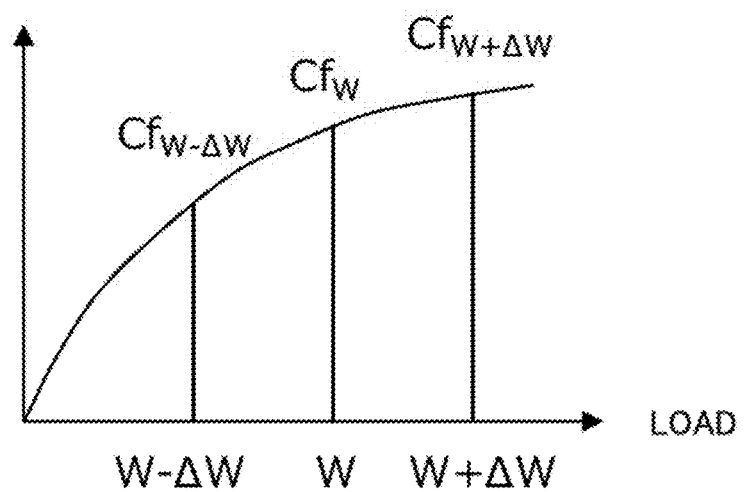
FIG. 10 is a graph illustrating the relationship between the load and the cornering force.

FIG. 9C illustrates the driving force, the lateral force and the cornering force which are generated at a wheel of the traveling vehicle. FIG. 10 is a graph illustrating the relationship between the load and the cornering force. In FIG. 10, "$Cf_{W-\Delta W}$" indicates the cornering force at the time when the load decreases from "W" by $\Delta W$, "$Cf_W$" indicates the cornering force at the time when the load is W, and "$Cf_{W+\Delta W}$" indicates the cornering force at the time when the load increases from W by $\Delta W$.

As illustrated in FIG. 10, the cornering force (i.e., the element of the lateral force perpendicular to the wheel travelling direction) varies according to a moderate saturation curve with respect to the load. Accordingly, the sum of the cornering force at the wheel with the load decreased by $\Delta W$ and the cornering force at the wheel with the load increased by $\Delta W$ is smaller than twice the original cornering force. Namely, the following equation (20) is satisfied.

$$2Cf_W > Cf_{W-\Delta W} + Cf_{W+\Delta W} \tag{20}$$

Thus, when there is a load shift among the wheels, the sum of the cornering forces at all the wheels of the vehicle decreases. Besides, with increasing variation of the roll angle of the vehicle, the shifted load among the wheels increases and the variation of the lateral force also increases. In this case, the variations of the wheel side slip angles $\beta_f$ and $\beta_r$ become large and the steering angle offset coefficient D (see the equation (16)) which varies depending on the wheel side slip angles $\beta_f$ and $\beta_r$ also varies, thus leading to increase of the error of the steering angle-based yaw rate $\psi\bullet_S$ which uses the steering angle offset coefficient D.

In response to the above consideration, as indicated in the equation (3), the control unit 15 determines that the accuracy of the steering angle-based yaw rate $\psi\bullet_S$ which includes the steering angle offset coefficient D decreases relative to the accuracy of the gyro sensor-based yaw rate $\psi\bullet_G$ which does not include the steering angle offset coefficient D with increasing roll angle difference $\Delta\phi$. Thus, the control unit 15 determines weights on the gyro sensor-based yaw rate $\psi\bullet_G$ and the steering angle-based yaw rate $\psi\bullet_S$ so that the weight on the steering angle-based yaw rate $\psi\bullet_S$ decreases relative to the weight on the gyro sensor-based yaw rate $\psi\bullet_G$ with increasing roll angle difference $\Delta\phi$. Accordingly, even when it is impossible to estimate the yaw angle based on the output of the LIDAR 21, the control unit 15 can calculate the estimated yaw angle $\psi_E$ with a high degree of accuracy.

(3-3) Weighting Based on Lateral Acceleration Difference $\Delta\alpha_y$

The following equation can be derived from the equations (8) and (9).

$$m\alpha_y = 2Y_f + 2Y_r$$

According to the above equation, it can be seen that the lateral forces $Y_f$ and $Y_r$ vary in response to the variation of the lateral acceleration $\alpha_y$. According to the above-mentioned relationships "$Y_f = -K_f\bullet\beta_f$" and "$Y_r = -K_r\bullet_r$", it also can be seen that at least one of the wheel side slip angles $\beta_f$ and $\beta_r$ varies in response to the variation of the lateral forces $Y_f$ and $Y_r$. Thus, when the variation of the lateral acceleration $\alpha_y$ is large, the steering angle offset coefficient D (see the equation (16)) which varies depending on the lateral forces $Y_f$ and $Y_r$ also varies and therefore the error of the steering angle-based yaw rate $\psi\bullet_S$ which uses the steering angle offset coefficient D becomes large.

In response to the above consideration, as indicated in the equation (3), the control unit 15 determines that the accuracy of the steering angle-based yaw rate $\psi\bullet_S$ which includes the steering angle offset coefficient D decreases relative to the accuracy of the gyro sensor-based yaw rate $\psi\bullet_G$ which does not include the steering angle offset coefficient D with increasing lateral acceleration difference $\Delta\alpha_y$. Thus, the control unit 15 determines weights on the gyro sensor-based yaw rate $\psi\bullet_G$ and the steering angle-based yaw rate $\psi\bullet_S$ so that the weight on the steering angle-based yaw rate $\psi\bullet_S$ decreases relative to the weight on the gyro sensor-based yaw rate $\psi\bullet_G$ with increasing lateral acceleration difference $\Delta\alpha_y$. Accordingly, even when it is impossible to estimate the yaw angle based on the output of the LIDAR 21, the control unit 15 can calculate the estimated yaw angle $\psi_E$ with a high degree of accuracy.

(3-4) Weighting Based on Longitudinal Acceleration Difference $\Delta\alpha_x$ and Pitch Angle Difference $\Delta\theta$ Generally, the driving force of the vehicle varies depending on the variation of either the longitudinal acceleration $\alpha_x$ or the pitch angle $\theta$. The slip ratio $\lambda$ dynamically varies depending on the running state of the vehicle and the slip ratio $\lambda$ varies at the time of the acceleration or deacceleration of the vehicle. Thus, the slip ratio $\lambda$ is likely to vary when the driving force of the vehicle varies. Besides, as indicated by the relationship between the lateral force and the slip ratio $\lambda$ in above FIG. 7B, the lateral force varies in response to the variation of the slip ratio $\lambda$. Thus, the wheel side slip angles $\beta_f$ and $\beta_r$ are likely to vary as a result of the variation of the slip ratio $\lambda$. Thus, the steering angle offset coefficient D (see the equation (16)) which varies depending on the wheel side slip angles $\beta_f$ and $\beta_r$ also varies with increasing longitudinal acceleration difference $\Delta\alpha_x$ or pitch angle difference $\Delta\theta$ and therefore the error of the steering angle-based yaw rate $\psi\bullet_S$ which includes the steering angle offset coefficient D becomes large.

In response to the above consideration, as indicated in the equation (3), the control unit 15 determines that the accuracy of the steering angle-based yaw rate $\psi\bullet_S$ which includes the steering angle offset coefficient D decreases relative to the accuracy of the gyro sensor-based yaw rate $\psi\bullet_G$ which does not include the steering angle offset coefficient D with increasing longitudinal acceleration difference $\Delta\alpha_x$ or pitch angle difference $\Delta\theta$. Thus, the control unit 15 determines weights on the gyro sensor-based yaw rate $\psi\bullet_G$ and the steering angle-based yaw rate $\psi\bullet_S$ so that the weight on the steering angle-based yaw rate $\psi\bullet_S$ decreases relative to the weight on the gyro sensor-based yaw rate $\psi\bullet_G$ with increasing longitudinal acceleration difference $\Delta\alpha_x$ or pitch angle difference $\Delta\theta$. Accordingly, even when it is impossible to estimate the yaw angle based on the output of the LIDAR 21, the control unit 15 can calculate the estimated yaw angle $\psi_E$ with a high degree of accuracy.

Technically, the cornering stiffnesses $K_f$ and $K_r$ vary in response to the variation of the slip ratio $\lambda$ and the lateral forces $Y_f(=-K_f\bullet\beta_f)$ and $Y_r(=-K_r\bullet\beta_r)$ vary in response to the cornering stiffnesses $K_f$ and $K_r$. As a result, the wheel side slip angles $\beta_f$ and $\beta_r$ are likely to vary. In this way, in response to the variation of the slip ratio $\lambda$ based on the longitudinal acceleration difference $\Delta\alpha_x$ or pitch angle difference $\Delta\theta$, the wheel side slip angles $\beta_f$ and $\beta_r$ are likely to vary. In contrast, it is not strictly true that the wheel side slip angles $\beta_f$ and $\beta_r$ necessarily vary in response to the slip ratio $\lambda$. Thus, the weighting based on the longitudinal acceleration difference $\Delta\alpha_x$ and the pitch angle difference $\Delta\theta$ is less important than the weighting based on the temperature difference $\Delta T$, the lateral acceleration difference $\Delta\alpha_y$ and the roll angle difference $\Delta\phi$. Accordingly, for example, at the time of calculating the estimated yaw rate $\psi\bullet_E$ in the case the calculation of the yaw angle based on the LIDAR 21 is impossible, the control unit 15 may determine the weighting so that the influence of the weighting based on the longitudinal acceleration difference $\Delta\alpha_x$ and the pitch angle difference $\Delta\theta$ is smaller than that of the weighting based on the temperature difference $\Delta T$, lateral acceleration difference $\Delta\alpha_y$ and the roll angle difference $\Delta\phi$. For example, the control unit 15 may normalize each of the temperature difference $\Delta T$, longitudinal acceleration difference $\Delta\alpha_x$, lateral acceleration difference $\Delta\alpha_y$, pitch angle difference $\Delta\theta$ and roll angle difference $\Delta\phi$ so that the longitudinal acceleration difference $\Delta\alpha_x$ and the pitch angle difference $\Delta\theta$ are smaller than the temperature difference $\Delta T$, lateral acceleration difference $\Delta\alpha_y$ and the roll angle difference $\Delta\phi$.

(4) Determination of Possibility of LIDAR Measurement

Next, a description will be given of the specific example of an approach for determination of the possibility of the measurement of the yaw angle and the vehicle speed by use of the LIDAR 21 at step S102 in FIG. 3.

For example, by referring to the map DB 10, the control unit 15 determines whether or not there is a landmark to be used for measurement of the yaw angle and the vehicle speed by use of the LIDAR 21. In other words, the control unit 15 determines whether or not there is a landmark registered on the map DB 10 and associated with a position situated within a target measurement range of the LIDAR 21 on the map DB 10. In this case, for example, on the map DB 10, positional information of landmarks that becomes bases of the measurement of the yaw angle and the vehicle speed by use of the LIDAR 21 is associated with information (e.g., shape information) needed to identify each of the landmarks.

Then, when there is no landmark registered on the map DB 10 and associated with a position situated within a target measurement range of the LIDAR 21 on the map DB 10, the control unit 15 determines that the measurement of the yaw angle and the vehicle speed by use of the LIDAR 21 cannot be performed, thus proceeding with the process at step S108.

In this case, the control unit 15 firstly specifies the target measurement range of the LIDAR 21 on the basis of: the estimated or measured orientation corresponding to the traveling direction of the vehicle; the estimated or measured position of the vehicle; the pre-stored maximum ranging distance of the LIDAR 21; and the pre-stored scan angle range of the LIDAR 21 with respect to the traveling direction of the vehicle. Then, the control unit 15 determines whether or not there is a landmark registered on the map DB 10 and associated with a position situated within the specified target measurement range of the LIDAR 21 on the map DB 10. Then, when there is no landmark registered on the map DB 10 and associated with a position situated within the target measurement range of the LIDAR 21 on the map DB 10, the control unit 15 determines that the measurement of the yaw angle and the vehicle speed by use of the LIDAR 21 cannot be performed.

Even if the control unit 15 determines that there is a landmark registered on the map DB 10 and associated with a position situated within the specified target measurement range of the LIDAR 21 on the map DB 10, the control unit 15 determines that the measurement of the yaw angle and the vehicle speed by use of the LIDAR 21 cannot be performed in such a case that the control unit 15 determines that the landmark does not actually exist.

In this case, for example, with reference to the map DB 10, the control unit 15 specifies the shape and the position of the landmark situated within the measurement target range of the LIDAR 21. Then, the control unit 15 determines the similarity between the shape and the position of the landmark specified by use of the map DB 10 and these specified by a point group outputted by the LIDAR 21. Then, when determining that there is no point group which indicates the shape and the position of the landmark similar to these specified by use of the map DB 10, the control unit 15 determines that there is no target landmark, thus determining that the measurement of the yaw angle and the vehicle speed by use of the LIDAR 21 cannot be performed.

According to these examples, the control unit 15 can accurately determine the possibility of the measurement of the yaw angle and the vehicle speed by use of the LIDAR 21 at step S102 in FIG. 3.

[Supplemental Explanation of Effect]

Next, effects according to the embodiment will be supplementally explained.

According to the calculation of the estimated yaw rate $\dot{\psi}^*_E$ indicated by the equation (3), the control unit 15 can accurately calculate the estimated yaw rate $\dot{\psi}^*_E$ while suitably covering (compensating for) the shortcomings of both of the gyro sensor-based yaw rate $\dot{\psi}^*_G$ and the steering angle-based yaw rate $\dot{\psi}^*_S$, wherein the error of the gyro sensor-based yaw rate $\dot{\psi}^*_G$ increases with increasing temperature variation (i.e., temperature difference $\Delta T$) and the error of the steering angle-based yaw rate $\dot{\psi}^*_S$ increases with increasing variation of the longitudinal and lateral acceleration (i.e., longitudinal acceleration difference $\Delta \alpha_x$ and lateral acceleration difference $\Delta \alpha_y$), increasing pitch angle variation (i.e., pitch angle difference $\Delta \theta$) and increasing roll angle variation (i.e., roll angle difference $\Delta \phi$). Every time the control unit 15 measures the yaw angle and the vehicle speed through the measurement of the landmark by use of the LIDAR 21, the control unit 15 performs the calibrations (see steps S105 and S106 in FIG. 3) of the gyro sensitivity coefficient A, the gyro offset coefficient B, the steering angle sensitivity coefficient C and the steering angle offset coefficient D. Thereby, the reliability of the gyro sensor-based yaw rate $\dot{\psi}^*_G$ and the steering angle-based yaw rate $\dot{\psi}^*_S$ is suitably maintained.

It also can be said that the measurement by the LIDAR 21 may be repeatedly performed at several seconds intervals because: a rapid temperature variation does not occur (i.e., the temperature difference $\Delta T$ is small) in such a condition that the measurement by the LIDAR 21 is performed at several seconds or less intervals; the rapid longitudinal acceleration variation does not occur (i.e., the longitudinal acceleration difference $\Delta \alpha_x$ is small) in a normal driving of vehicle; the rapid lateral acceleration variation does not occur (i.e., the lateral acceleration difference $\Delta \alpha_y$ is small) in a moderate steering operation; and the rapid pitch angle variation and/or the rapid roll angle variation do not occur (i.e., the pitch angle difference $\Delta \theta$ and the roll angle difference $\Delta \phi$ are small) on a normal road surface. This also indicates that landmarks to be used to measure the yaw angle and the vehicle speed by the LIDAR 21 may be arranged at intervals of a certain length. For example, in such a case that mile markers arranged at intervals of a hundred meters are regarded as landmarks in highway driving and that the maximum measurement distance of the LIDAR 21 is fifty meters, duration of inability of measurement by the LIDAR 21 is merely 1.8 seconds at 100 km/h driving and 3.6 seconds at 50 km/h driving.

MODIFICATIONS

Next, a description will be given of preferred modifications of the embodiment. The following modifications may be applied to the above embodiment in any combination.

First Modification

When determining the weights on the gyro sensor-based yaw rate $\dot{\psi}^*_G$ and the steering angle-based yaw rate $\dot{\psi}^*_S$ according to the equation (3), the control unit 15 may multiply each of the difference values $\Delta T$, $\Delta \alpha_x$, $\Delta \alpha_y$, $\Delta \theta$ and $\Delta \phi$ by each predetermined coefficient. In other words, in order to calculate the estimated yaw rate $\dot{\psi}^*_E$ according to the following equation (21), the control unit 15 may determine coefficients "$w_T$", "$w_{\alpha x}$", "$w_{\alpha y}$", "$w_\theta$" and "$w_\phi$" by which each of the difference values $\Delta T$, $\Delta \alpha_x$, $\Delta \alpha_y$, $\Delta \theta$ and $\Delta \phi$ is to be multiplied.

$$\dot{\psi}_E[t] = \frac{w_T \Delta T^2}{w_T \Delta T^2 + w_{\alpha x}\Delta \alpha_x^2 + w_{\alpha y}\Delta \alpha_y^2 + w_\theta \Delta \theta^2 + w_\phi \Delta \phi^2} \dot{\psi}_S[t] + \frac{w_{\alpha x}\Delta \alpha_x^2 + w_{\alpha y}\Delta \alpha_y^2 + w_\theta \Delta \theta^2 + w_\phi \Delta \phi^2}{w_T \Delta T^2 + w_{\alpha x}\Delta \alpha_x^2 + w_{\alpha y}\Delta \alpha_y^2 + w_\theta \Delta \theta^2 + w_\phi \Delta \phi^2} \dot{\psi}_G[t] \quad (21)$$

According the equation (21), when one or more values out of the difference values $\Delta T$, $\Delta \alpha_x$, $\Delta \alpha_y$, $\Delta \theta$ and $\Delta \phi$ have especially great influence on the error, the control unit 15 may determine high coefficients corresponding to the one or more values. Thereby, it is possible to more accurately determine each weight on the gyro sensor-based yaw rate $\dot{\psi}^*_G$ and the steering angle-based yaw rate $\dot{\psi}^*_S$.

Examples of determining the coefficients $w_T$, $w_{\alpha x}$, $w_{\alpha y}$, $w_\theta$ and $w_\phi$ will be explained.

For example, the control unit 15 determines the coefficients so that the coefficient $w_T$ become larger than the other coefficients for the gyro sensor 24 whose gyro sensitivity coefficient A and gyro offset coefficient B vary with increasing temperature variation. For example, in this case, variation rates of the gyro sensitivity coefficient A and the gyro offset coefficient B of the gyro sensor 24 with respect to the temperature variation are preliminarily measured through experimental trials. Then, if the variation rates of the gyro sensitivity coefficient A and the gyro offset coefficient B of the gyro sensor 24 are larger than these of a typical gyro sensor, the control unit 15 determines the coefficients of the gyro sensor 24 so that the coefficient $w_T$ is larger than the other coefficient. In some embodiments, the control unit 15 may determine the coefficient $w_T$ to be larger than the average of the other coefficients.

In another example, when determining that the road where the vehicle travels has a slippery surface, the control unit 15 determines the coefficient $w_{\alpha x}$ to be larger than the other coefficients. Generally, when the road has a slippery surface such as a moist road surface and a froze road surface, the slip ratio $\lambda$ for obtaining the same driving force is larger than the slip ratio $\lambda$ in cases where the road has a dried road surface. Thus, when the longitudinal acceleration difference $\Delta\alpha_x$ varies on a slippery surface, the wheel side slip angles $\beta_f$ and $\beta_r$ greatly vary. In this case, the variation of the steering angle offset coefficient D with respect to the longitudinal acceleration difference $\Delta\alpha_x$ becomes large and the degree of the influence on the error of the steering angle-based yaw rate $\psi\textbf{•}_S$ due to the longitudinal acceleration difference $\Delta\alpha_x$ becomes large. In response to the above consideration, the control unit 15 determines the coefficient $w_{\alpha x}$ to be larger than the other coefficients at the time of determining that the road surface is a slippery surface. For example, the control unit 15 determines that the road surface is a slippery surface in such cases that it detects a drop of rain by use of a raindrop sensor, or that it recognizes a rain drop or snow drop based on weather information supplied from a server device, or that it recognizes slippery conditions of the driving road surface based on road surface information included in the map DB 10.

In still another example, with increasing vehicle weight, the control unit 15 increases at least one of the coefficients $w_\theta$ and $w_\phi$ relative to the other coefficients. Generally, the heavier the vehicle weight is, the larger the variation of the slip ratio $\lambda$ in response to the road gradient variation becomes. As a result, the heavier the vehicle weight is, the larger the wheel side slip angles $\beta_f$ and $\beta_r$ become. Thus, in this case, the heavier the vehicle weight is, the larger the variation of the steering angle offset coefficient D with respect to the pitch angle difference $\Delta\theta$ becomes and therefore the larger the degree of the influence on the error of the steering angle-based yaw rate $\psi\textbf{•}_S$ due to the pitch angle difference $\Delta\theta$ becomes. Similarly, the heavier the vehicle weight is, the larger the shifted load between the wheels due to the roll angle variation becomes and therefore the larger the lateral force becomes. The larger the variation of the lateral force is, the larger the variation of the wheel side slip angles $\beta_f$ and $\beta_r$ becomes. Thus, in this case, the heavier the vehicle weight is, the larger the variation of the steering angle offset coefficient D with respect to the roll angle difference $\Delta\phi$ becomes and therefore the larger the degree of the influence on the error of the steering angle-based yaw rate $\psi\textbf{•}_S$ due to the roll angle difference $\Delta\phi$ becomes.

In response to the above consideration, the control unit 15 makes at least one of the coefficients $w_\theta$ and $w_\phi$ large relative to the other coefficients with increasing vehicle weight. For example, in accordance with the number of persons on the vehicle detected based on the output of a sensor which detects the presence/absence of a seating person on each seat, the control unit 15 makes at least one of the coefficients $w_\theta$ and $w_\phi$ large. In this case, the heavier the basic vehicle weight of the vehicle is, the larger initial values of the coefficients $w_\theta$ and $w_\phi$ that is set when the number of persons on the vehicle is zero the control unit 15 determines.

Second Modification

When calculating the steering angle-based yaw rate $\psi\textbf{•}_S$ based on the equation (2), instead of using the detected value of the steering angle which the steering angle sensor 28 outputs, the control unit 15 may use the estimate value of the steering angle calculated based on the rotational speed difference between the wheels.

In this case, the control unit 15 calculates the estimate value of the steering angle based on the output of the sensors which are provided on the all wheels respectively for detecting the rotational speed of each of the wheels. In this case, the control unit 15 calculates the steering angle S[t] in the equation (2) by using the following equation:

$$S[t] = (S_f[t] + S_r[t])/2,$$

wherein "$S_f[t]$" indicates relative rotational speed (i.e., "right front wheel rotational speed minus left front wheel rotational speed") of the right front wheel to the left front wheel at the time t and "$S_r[t]$" indicates relative rotational speed (i.e., "right rear wheel rotational speed minus left rear wheel rotational speed") of the right rear wheel to the left rear wheel at the time t.

Even in this case, the control unit 15 can calculate the steering angle based on the output of each sensor which detects the rotational speed of each wheel to thereby calculate the steering angle-based yaw rate $\psi\textbf{•}_S$ according to the equation (2).

Third Modification

The control unit 15 may calculate the yaw angle with a high degree of accuracy based on an external sensor other than the LIDAR 21.

In this case, when the control unit 15 can calculate the yaw angle with a high degree of accuracy based on the output of the target external sensor, the control unit 15 sets the yaw angle based on the output of the target sensor as the estimated yaw angle $\psi_E$ while calibrating the coefficients A to D. In contrast, when the control unit 15 cannot calculate the yaw angle on the basis of the output of the target external sensor, the control unit 15 calculates the estimated yaw angle $\psi_E$ after calculating the estimated yaw rate $\psi\textbf{•}_E$ by using the coefficients A to D according to the equation (3) in the same way as the embodiment. As mentioned above, the control unit 15 updates the coefficients A to D in the same way as the embodiment by using an external sensor capable of calculating an accurate yaw angle other than the LIDAR 21 to thereby calculate the estimated yaw angle $\psi_E$ with a high degree of accuracy even when the external sensor is not available.

Fourth Modification

According to the equation (3), the control unit 15 determines each weight on the gyro sensor-based yaw rate $\psi\textbf{•}_G$ and the steering angle-based yaw rate $\psi\cdot_S$ by using all difference values $\Delta T$, $\Delta\alpha_x$, $\Delta\alpha_y$, $\Delta\theta$ and $\Delta\phi$. However, the method for determination of the weights on the gyro sensor-based yaw rate $\psi\cdot_G$ and the steering angle-based yaw rate $\psi\cdot_S$ to which the present invention can be applied is not limited to the above method.

As a first example, the control unit 15 calculates the estimated yaw rate $\psi\cdot_E[t]$ by using each difference value $\Delta T$, $\Delta\alpha_y$ and $\Delta\phi$ other than the longitudinal acceleration difference $\Delta\alpha_x$ and the pitch angle difference $\Delta\theta$. In this case, for example, the control unit 15 determines $\Delta\alpha_x$ and $\Delta\theta$ in the equation (3) as "0". As mentioned in the section "(3-4) Weighting Based on Lateral Acceleration Difference $\Delta\alpha_y$ and Pitch Angle Difference $\Delta\theta$", the weighting based on the longitudinal acceleration difference $\Delta\alpha_x$ and the pitch angle difference $\Delta\theta$ is less important than the weighting based on the temperature difference $\Delta T$, the lateral acceleration difference $\Delta\alpha_y$ and the roll angle difference $\Delta\phi$. Thus, even in this case, the control unit 15 can determine each weight on the gyro sensor-based yaw rate $\psi\cdot_G$ and the steering angle-based yaw rate $\psi\cdot_S$ in accordance with their reliabilities. It is noted that the control unit 15 may calculate the estimated yaw rate $\psi\cdot_E[t]$ except for either one of the longitudinal acceleration difference $\Delta\alpha_x$ and the pitch angle difference $\Delta\theta$.

As a second example, the control unit 15 calculates the estimated yaw rate $\psi\cdot_E[t]$ by using one or two out of the difference values $\Delta T$, $\Delta\alpha_y$ and $\Delta\phi$ other than the longitudinal acceleration difference $\Delta\alpha_x$ and the pitch angle difference $\Delta\theta$. In case of weighing based on any one of the difference values $\Delta T$, $\Delta\alpha_y$ and $\Delta\phi$ according to the second example, the control unit 15 may normalize the selected difference value (referred to as "target difference value $\Delta$") to be within a range of 0 to 1 and multiplies either one of the gyro sensor-based yaw rate $\psi\cdot_G$ and the steering angle-based yaw rate $\psi\cdot_S$ by "1−$\Delta$" and the other by "$\Delta$". For example, when the target difference value $\Delta$ is temperature difference $\Delta T$, the control unit 15 multiplies the steering angle-based yaw rate $\psi\cdot_S$ by "1−$\Delta$" and the gyro sensor-based yaw rate $\psi\cdot_G$ by "$\Delta$".

In this way, even when the control unit 15 uses only a part of the difference values $\Delta T$, $\Delta\alpha_x$, $\Delta\alpha_y$, $\Delta\theta$ and $\Delta\phi$, the control unit 15 can suitably calculate the estimated yaw rate $\psi\cdot_E$.

BRIEF DESCRIPTION OF REFERENCE NUMBERS

1 Vehicle mounted apparatus
11 Sensor group
12 Storage unit
14 Input unit
15 Control unit
16 Output unit
17 Yaw angle estimator
18 Calibrator

The invention claimed is:

1. A calculation apparatus comprising:
a memory configured to store one or more programs; and
a control unit coupled to the memory and configured to execute the one or more programs to:
measure a yaw angle for a first processing time,
determine the measured yaw angle as an estimated yaw angle for the first processing time,
calculate a measured yaw rate from the estimated yaw angle,
correct, on a basis of the measured yaw rate and a speed of a moving body for the first processing time, calculation information to be used for calculation of an estimated yaw rate in a case that a measured yaw angle, for a second processing time subsequent to the first processing time, is not obtained,
calculate the estimated yaw rate for the second processing time based on the speed of the moving body and the corrected calculation information from the first processing time during which the measured yaw angle was obtained, and
calibrate output of one or more sensors included on the moving body based on the corrected calculation information.

2. The calculation apparatus according to claim 1, wherein the control unit is further configured to execute the one or more programs to:
calculate a second yaw rate of the moving body based on output of an angular speed sensor mounted on the moving body and the corrected calculation information;
calculate a third yaw rate of the moving body based on a steering angle of the moving body, a speed of the moving body and the calculation information; and
calculate the estimated yaw rate based on the second yaw rate and the third yaw rate.

3. The calculation apparatus according to claim 2, wherein the control unit is further configured to execute the one or more programs to correct, on a basis of the measured yaw angle and the speed of the moving body, each of first conversion information and second conversion information as the calculation information, the measured yaw angle being obtained from the information associated with surroundings of the moving body, the first conversion information used to calculate the second yaw rate, the second conversion information being used to calculate the third yaw rate.

4. The calculation apparatus according to claim 2, wherein the control unit is further configured to execute the one or more programs to determine weights, which are used for calculating the estimated yaw rate, on the second yaw rate and on the third yaw rate on a basis of at least one of
temperature variation amount,
variation amount of lateral acceleration of the moving body, and
variation amount of roll angle of the moving body,
which are calculated from the first processing time of correcting the calculation information.

5. The calculation apparatus according to claim 4, wherein the control unit is further configured to execute the one or more programs to determine the weights on the second yaw rate and on the third yaw rate on a basis of
at least one of variation amount of longitudinal acceleration of the moving body and variation amount of a pitch angle of the moving body which are calculated from the first processing time of correcting the calculation information
in addition to the temperature variation amount, the variation amount of the lateral acceleration and the variation amount of the roll angle.

6. A control method executed by a calculation apparatus, comprising:
measuring a yaw angle for a first processing time;
determining the measured yaw angle as an estimated yaw angle for the first processing time;
calculating a measured yaw rate from the estimated yaw angle;

correcting, on a basis of the measured yaw rate and a speed of a moving body for the first processing time, calculation information to be used for calculation of an estimated yaw rate in a case that a measured yaw angle, for a second processing time subsequent to the first processing time, is not obtained;

calculating the estimated yaw rate for the second processing time based on the speed of the moving body and the corrected calculation information from the first processing time during which the measured yaw angle was obtained; and calibrating output of one or more sensors included on the moving body based on the corrected calculation information.

7. A non-transitory computer readable medium including instructions executed by a computer, the instructions comprising:

measuring a yaw angle for a first processing time;

determining the measured yaw angle as an estimated yaw angle for the first processing time;

calculating a measured yaw rate from the estimated yaw angle;

correcting, on a basis of the measured yaw rate and a speed of a moving body for the first processing time, calculation information to be used for calculation of an estimated yaw rate in a case that a measured yaw angle, for a second processing time subsequent to the first processing time, is not obtained;

calculating the estimated yaw rate for the second processing time based on the speed of the moving body and the corrected calculation information from the first processing time during which the measured yaw angle was obtained; and calibrating output of one or more sensors included on the moving body based on the corrected calculation information.

* * * * *